United States Patent
Ali-Santosa et al.

(10) Patent No.: US 7,266,731 B2
(45) Date of Patent: Sep. 4, 2007

(54) METHOD AND APPARATUS FOR MANAGING REMOTE SOFTWARE CODE UPDATE

(75) Inventors: Gunawan Ali-Santosa, Milpitas, CA (US); Mehrdad Mojgani, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 478 days.

(21) Appl. No.: 09/991,338

(22) Filed: Nov. 13, 2001

(65) Prior Publication Data

US 2003/0093708 A1 May 15, 2003

(51) Int. Cl.
*G06F 11/00* (2006.01)

(52) U.S. Cl. ............................ 714/42; 714/49; 714/54; 717/126

(58) Field of Classification Search .................. 714/49, 714/54, 53, 42, 4; 717/170, 126
See application file for complete search history.

(56) References Cited

U.S. PATENT DOCUMENTS

| | | | |
|---|---|---|---|
| 5,022,028 A | | 6/1991 | Edmonds et al. |
| 5,740,359 A | * | 4/1998 | Hasegawa et al. ............. 714/47 |
| 5,761,510 A | | 6/1998 | Smith, Jr. et al. |
| 5,835,695 A | * | 11/1998 | Noll .............................. 714/6 |
| 5,835,911 A | | 11/1998 | Nakagawa et al. .......... 707/203 |
| 5,925,140 A | | 7/1999 | Hudson |
| 5,964,873 A | * | 10/1999 | Choi .............................. 713/2 |
| 5,974,454 A | | 10/1999 | Apfel et al. .................. 709/221 |
| 6,038,663 A | * | 3/2000 | Feldman ........................ 713/1 |
| 6,052,531 A | | 4/2000 | Waldin, Jr. et al. .......... 395/712 |
| 6,058,393 A | | 5/2000 | Meier et al. |
| 6,067,639 A | | 5/2000 | Rodrigues et al. |
| 6,131,159 A | | 10/2000 | Hecht et al. .................... 713/1 |
| 6,178,504 B1 | | 1/2001 | Fieres et al. |
| 6,178,546 B1 | | 1/2001 | McIntyre ........................ 717/3 |
| 6,202,070 B1 | | 3/2001 | Nguyen et al. |
| 6,205,579 B1 | | 3/2001 | Southgate |
| 6,347,398 B1 | | 2/2002 | Parthasarathy et al. |

(Continued)

FOREIGN PATENT DOCUMENTS

EP      0 292 248      11/1988

(Continued)

OTHER PUBLICATIONS

Snyder, Cary D., "Narrowed I/O Options Expand", Jun. 6, 2001, Microprocessor Watch, Issue #78, 5 pages.

(Continued)

*Primary Examiner*—Yolanda L. Wilson
(74) *Attorney, Agent, or Firm*—Gunnison, McKay & Hodgson, L.L.P.; Forrest Gunnison

(57) ABSTRACT

A method for managing remote software code update includes receiving a message from a remote device that includes a first code space having at least one segment and a second code space having one or more segment. The method also includes decoding the message to determine the execution mode of the remote device, indicating code in the first code space is corrupted if the execution mode indicates the remote device is executing in the second code space and indicating the code in the first code space is valid if the execution mode indicates the remote device is executing in the first code space.

7 Claims, 23 Drawing Sheets

U.S. PATENT DOCUMENTS

| | | | |
|---|---|---|---|
| 6,349,336 B1 | 2/2002 | Sit et al. ............ | 709/227 |
| 6,357,021 B1 * | 3/2002 | Kitagawa et al. ............ | 714/41 |
| 6,360,334 B1 | 3/2002 | Kavanagh et al. | |
| 6,370,686 B1 | 4/2002 | Delo et al. | |
| 6,389,467 B1 | 5/2002 | Eyal | |
| 6,405,309 B1 | 6/2002 | Cheng et al. | |
| 6,418,554 B1 | 7/2002 | Delo et al. | |
| 6,539,539 B1 | 3/2003 | Larsen et al. | |
| 6,584,559 B1 * | 6/2003 | Huh et al. ............ | 713/2 |
| 6,622,246 B1 * | 9/2003 | Biondi ............ | 713/100 |

FOREIGN PATENT DOCUMENTS

| | | |
|---|---|---|
| EP | 0 778 520 | 6/1997 |
| WO | WO98/43212 | 10/1998 |
| WO | WO98/52158 | 11/1998 |
| WO | WO 00/46666 | 8/2000 |

OTHER PUBLICATIONS

"The Configuration Software", 2000, WaferScale Integration Inc., brochure.

* cited by examiner

600

Page Register

| Bit | Data | Note |
|---|---|---|
| 0..2 | Main Flash Segment Select | 8 Segments Total |
| 3..4 | Boot Flash Segment Select | 4 Segments Total |
| 5 | Flash Code Select | 1: Main Flash Code<br>0: Boot Flash Code |
| 6..7 | Unused | |

VM Register

| Bit | Data |
|---|---|
| 0 | SRAM Is Code |
| 1 | Boot Flash Is Code |
| 2 | Main Flash Is Code |
| 3 | Boot Flash Is Data |
| 4 | Main Flash Is Data |
| 5..6 | Unused |
| 7 | Enable PIO |

FIG. 6B

Main Flash Segment 0 = (Device Space=Code) & (Flash Code Select=Main) & (address in 0000..3FFF)
OR (Device Space=Data) & (Main Flash Segment Select=0) & (address in 4000..7FFF))

Main Flash Segment 1 = (Device Space=Code) & (Flash Code Select=Main) & (address in 4000..7FFF)
OR (Device Space=Data) & (Main Flash Segment Select=1) & (address in 4000..7FFF))

Main Flash Segment 2 = (Device Space=Code) & (Flash Code Select=Main) & (address in 8000..BFFF)
OR (Device Space=Data) & (Main Flash Segment Select=2) & (address in 4000..7FFF))

Main Flash Segment 3 = (Device Space=Code) & (Flash Code Select=Main) & (address in C000..FFFF)
OR (Device Space=Data) & (Main Flash Segment Select=3) & (address in 4000..7FFF))

FIG. 7A

Boot Flash Segment 0 = (Device Space=Code) & (Flash Code Select=Boot) & (address in 0000..1FFF)
OR (Device Space=Data) & (Boot Flash Segment Select=0) & (address in 4000..5FFF))

Boot Flash Segment 1 = (Device Space=Code) & (Flash Code Select=Boot) & (address in 2000..3FFF)
OR (Device Space=Data) & (Boot Flash Segment Select=1) & (address in 4000..5FFF))

Boot Flash Segment 2 = (Device Space=Code) & (Flash Code Select=Boot) & (address in 4000..5FFF)
OR (Device Space=Data) & (Boot Flash Segment Select=2) & (address in 4000..5FFF))

Boot Flash Segment 3 = (Device Space=Code) & (Flash Code Select=Boot) & (address in 6000..7FFF)
OR (Device Space=Data) & (Boot Flash Segment Select=3) & (address in 4000..5FFF))

FIG. 7B

Marker Correlation

| M | ~M | |
|---|---|---|
| M4 | M12 | |
| M3 | M11 | |
| M2 | M10 | 2100 |
| M1 | M9 | |
| M8 | M13 | |
| M7 | M14 | |
| M6 | M15 | 2105 |
| M5 | M16 | |

FIG. 21A

| M | ~M | |
|---|---|---|
| M24 | M10 | |
| M2 | M20 | |
| M23 | M9 | 2110 |
| M1 | M19 | |
| M5 | M21 | |
| M18 | M15 | 2115 |
| M6 | M22 | |

FIG. 21B

METHOD AND APPARATUS FOR MANAGING REMOTE SOFTWARE CODE UPDATE

CROSS REFERENCE TO RELATED APPLICATIONS

This application is related to the following: U.S. patent application filed Nov. 13, 2001 in the name of inventors Gunawan Ali-Santosa and Mehrdad Mojgani, entitled "Method and Apparatus for Remote Software Code Update", Ser. No. 09/992,125, commonly assigned herewith. U.S. patent application filed Nov. 13, 2001 in the name of inventors Gunawan Ali-Santosa and Mehrdad Mojgani, entitled "Method and Apparatus for Detecting Corrupt Software Code", Ser. No. 09/993,975, commonly assigned herewith.

FIELD OF THE INVENTION

The present invention relates to the field of computer science. More particularly, the present invention relates to a method and apparatus for updating and detecting corruption in software code downloaded to a remote device.

BACKGROUND OF THE INVENTION

The software code executing in remote or embedded devices often needs to be updated both during development of the embedded device and after the device has been delivered to the customer (post-issuance). Typically, several code updates are required during product development. The reliability and efficiency of updates during development of the embedded device affect the time required to develop the product. The reliability and efficiency of post-issuance updates is also important, because non-functioning devices typically must be returned to the device issuer, resulting in shipping-related costs and delays.

One type of update is performed to fix "bugs" or problems with the software. Another type of update is performed to include new product features, such as special functions tailored for particular customers. A code update may fail for a number of reasons, including operator error, power failure and other unexpected events. These failure events sometimes make the device inoperable. These failure events may also make the device appear to function normally despite the existence of a failure within the code space. This latent problem may manifest itself subsequently during normal operation, often resulting in an inoperable device. Therefore, it is important to detect such a failure prior to program execution.

Such failure conditions are typically detected by reading back each byte of code previously written and comparing it against an expected value. This process is explained in more detail with reference to FIG. 1.

Turning to FIG. 1, a flow diagram that illustrates a typical method for detecting corrupted code by comparing the value of each storage unit downloaded to device with the corresponding value of the storage units read back from the device is presented. At 100, the code is downloaded to the embedded device. At 105, a previously downloaded byte is read from the embedded device. At 110, the byte is compared to the expected value. At 115, a determination is made regarding whether the byte value matches the expected value. At 120 an indication that the code is corrupted is made if the byte value does not match the expected value and the process ends at 135. If the byte value matches the expected value, at 125 a determination is made regarding whether there is another byte to check. This process continues until all bytes in the program have been checked. If all of the bytes have been checked and all of them match their expected values, an indication that the program is valid is made at 130.

Unfortunately, this method of reading back every byte and comparing it to an expected value is time-consuming. Additionally, the expected values for particular bytes may change with each software version, thus requiring special knowledge about each software version.

An improvement is made possible by using a checksum. This process of using a checksum is explained in more detail with reference to FIG. 2.

Turning now to FIG. 2, a flow diagram that illustrates a typical method for using a checksum to detect corrupted code is presented. At 200, the code is downloaded to the embedded device. At 205, a checksum is initialized. At 210, a byte previously downloaded is read. At 215, the byte value is added to the checksum. At 220, a determination is made regarding whether there is another byte to check. This process continues until the value of each program byte has been added to the checksum. At 225, the calculated checksum is compared to the expected checksum. If the calculated checksum and the expected checksum are not the same, an indication that the code is corrupted is made at 230 and the process ends at 240. If the calculated checksum and the expected checksum match, an indication that the code is valid is made at 235.

Unfortunately, this checksum method requires adding each byte, reading it back and comparing it against an expected value. While this method typically takes less time than reading and comparing every byte to an expected value, the method is still time-consuming. Additionally, the checksum method sometimes fails to detect corrupt code. In these cases, the calculated checksum of corrupted code matches the expected checksum, causing corrupt code to be used.

Once the determination that the code is corrupted is made, other code that is not corrupt must be executed. One typical solution is to provide complete redundancy by maintaining two copies of the code. One copy is typically maintained in "boot" flash, while the other is maintained in "main" flash. This is illustrated by FIG. 3.

Turning now to FIG. 3, a flow diagram that illustrates a method for updating code on an embedded device using separate copies of the program in boot flash memory and main flash memory is presented. At 300, the code is downloaded. At 305, a first copy of the program code is maintained in main flash memory and a second copy of the program code is maintained in boot flash memory. At 310, execution begins from boot flash memory. At 315, a determination is made regarding whether main flash memory is corrupted. If main flash memory is corrupted, the copy of the program code in boot flash memory is executed at 320. If main flash memory is not corrupted, a copy of the program code in main flash memory is executed at 325.

This solution provides complete redundancy so that one copy of the code may be executed when the other is corrupted. However, this redundancy also requires twice the memory, thus constraining the maximum program size in embedded devices that follow this approach.

Other solutions provide additional levels of redundancy. But this additional redundancy typically comes at the expense of even higher memory requirements, further constraining the maximum program size.

SUMMARY OF THE INVENTION

A method for updating code includes receiving a message from a remote device, the remote device including a first code space that includes at least one segment and a second code space that includes one or more segment. The method also includes decoding the message to determine the execution mode of the remote device, indicating code in the first code space is corrupted if the execution mode indicates the remote device is executing in the second code space and indicating the code in the first code space is valid if the execution mode indicates the remote device is executing in the first code space. According to one aspect, the method further includes receiving self-test results from the remote device if the first code space is valid and indicating code in the second code space must be restored if the self-test results indicate the code in the second code space is invalid. According to another aspect, the method further includes filtering subsequent communications to the remote device if the execution mode indicates the remote device is executing in the second code space.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 6A is a block diagram that illustrates configuring a page register in accordance with one embodiment of the present invention.

FIG. 6B is a block diagram that illustrates configuring a virtual memory register in accordance with one embodiment of the present invention.

FIG. 7A is a code sample that illustrates mapping main flash memory in accordance with embodiments of the present invention.

FIG. 7B is a code sample that illustrates mapping boot flash memory in accordance with embodiments of the present invention.

FIG. 21A is a table that illustrates correlation between markers in a main flash memory in accordance with one embodiment of the present invention.

FIG. 21B is a table that illustrates correlation between markers in a boot flash memory in accordance with one embodiment of the present invention.

DETAILED DESCRIPTION

Figure 1:
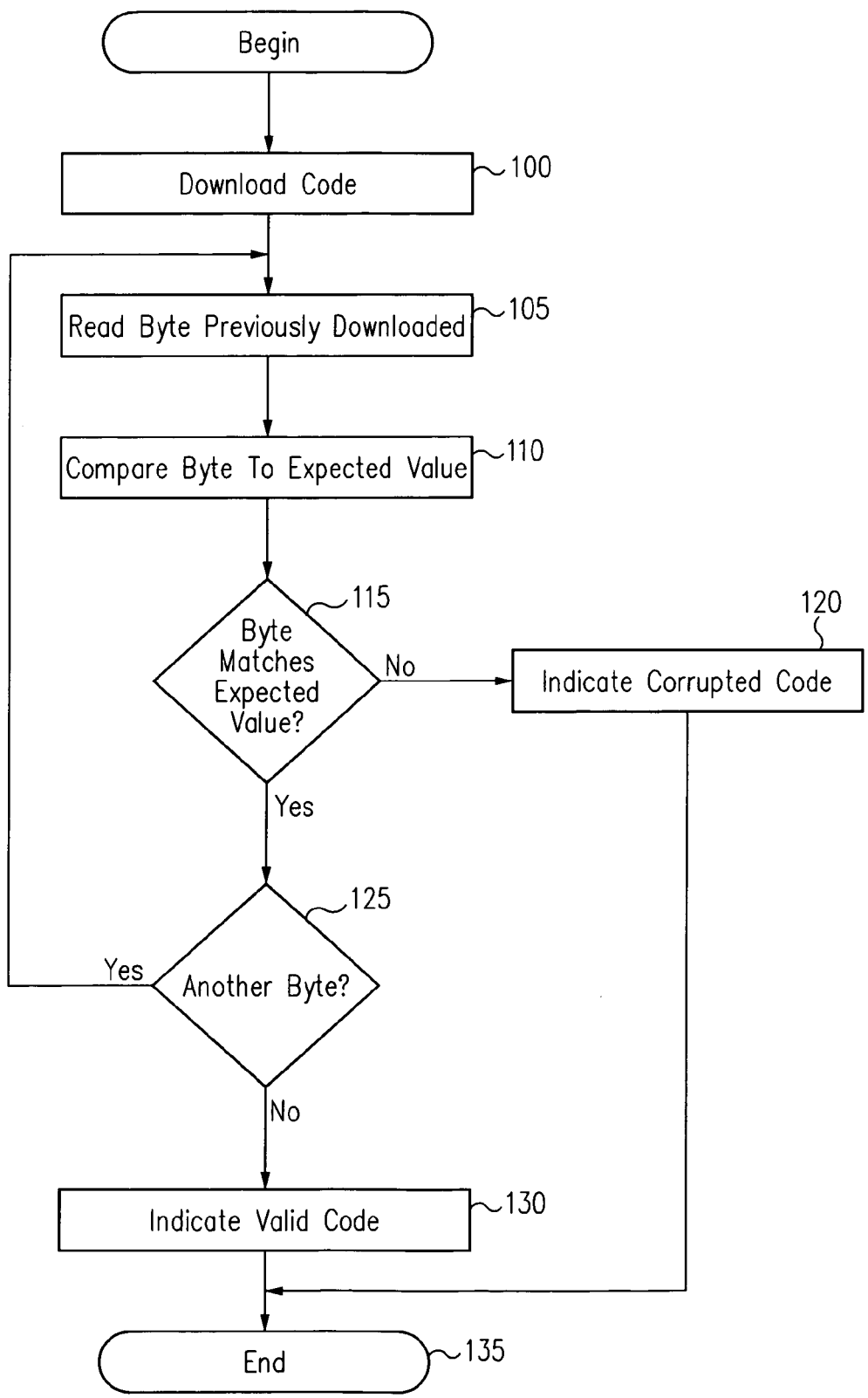
FIG. 1 is a flow diagram that illustrates a typical method for detecting corrupted code by comparing the value of each storage unit downloaded to device with the corresponding value of the storage units read back from the device.
Figure 2:
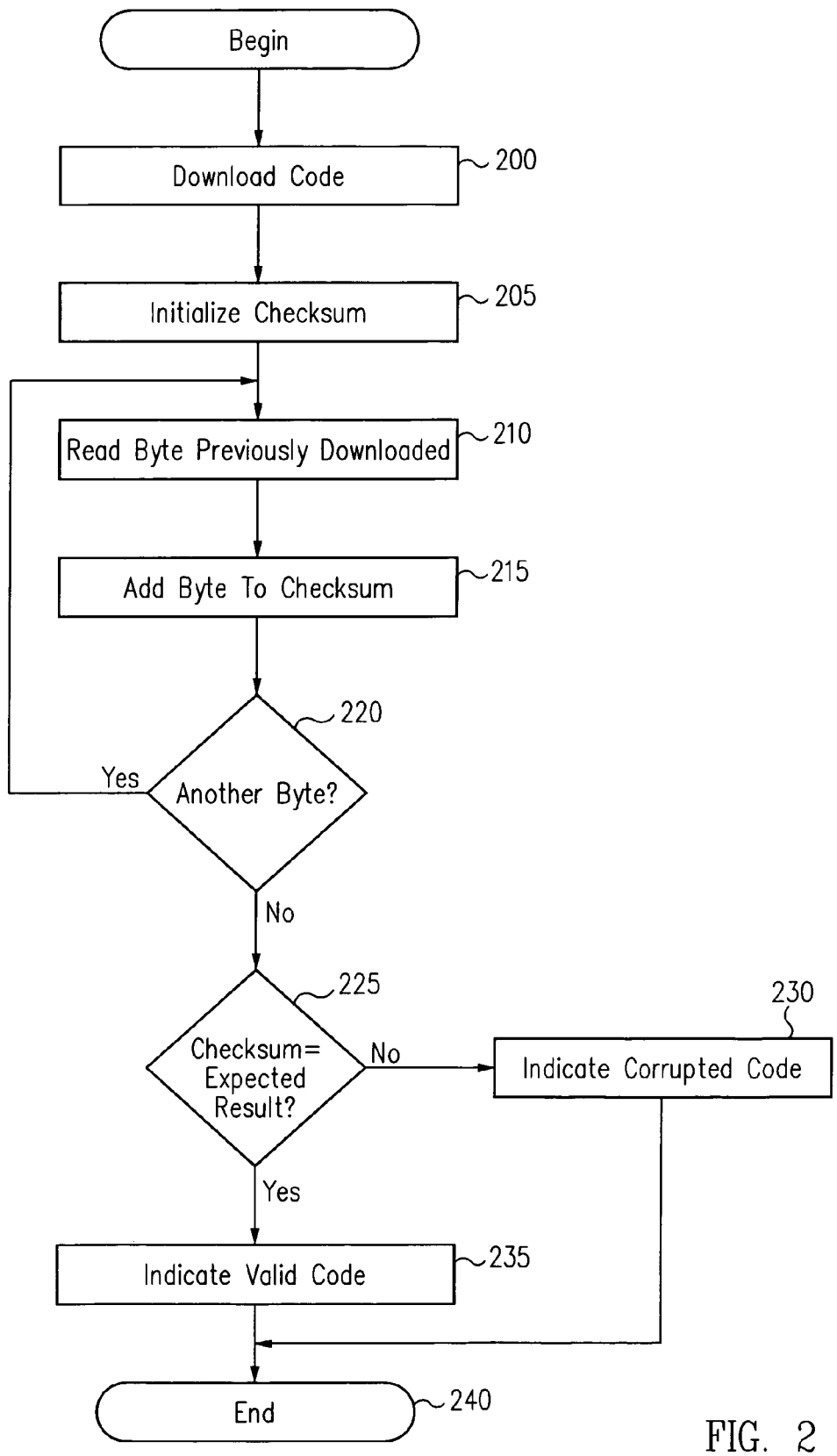
FIG. 2 is a flow diagram that illustrates a typical method for using a checksum to detect corrupted code.
Figure 3:
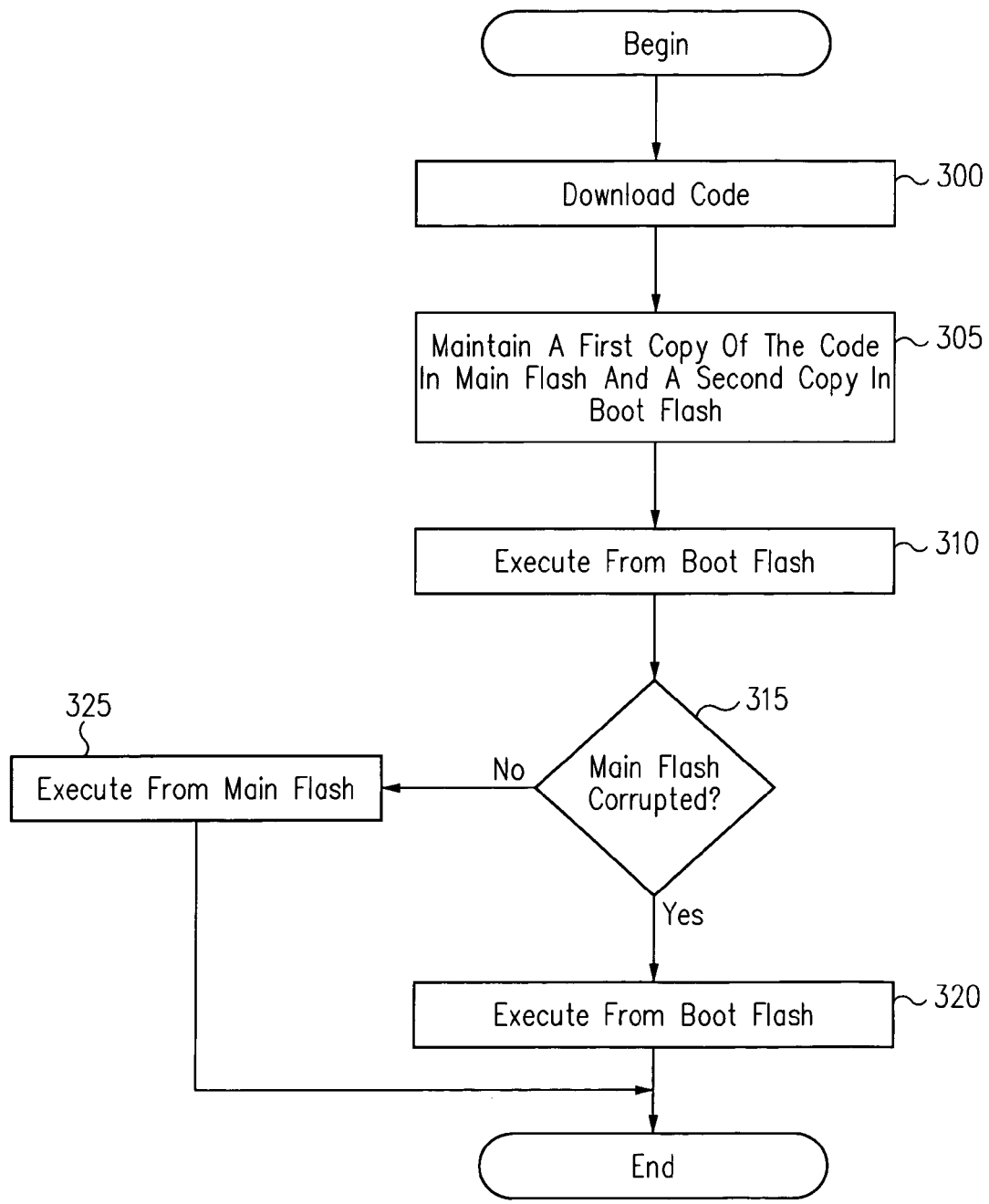
FIG. 3 is a flow diagram that illustrates a method for updating code on an embedded device using separate copies of the program in boot flash memory and main flash memory.

Embodiments of the present invention are described herein in the context of a method and apparatus for updating and detecting corruption in software code downloaded to a remote device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using programs running on computers. Different implementations may be used and may include other types of operating systems, computing platforms, computer programs, firmware, computer languages and/or general-purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

According to embodiments of the present invention, updating code for a first program resident in a first code space includes transferring program control to a second program executing in a second code space, mapping a program segment to data space and writing the segment. According to other embodiments of the present invention, detecting corrupt software code includes defining a correlation rule between two or more markers in a program, downloading the program to an embedded device and using the correlation rule to determine whether the downloaded program is corrupt.

Figure 4:
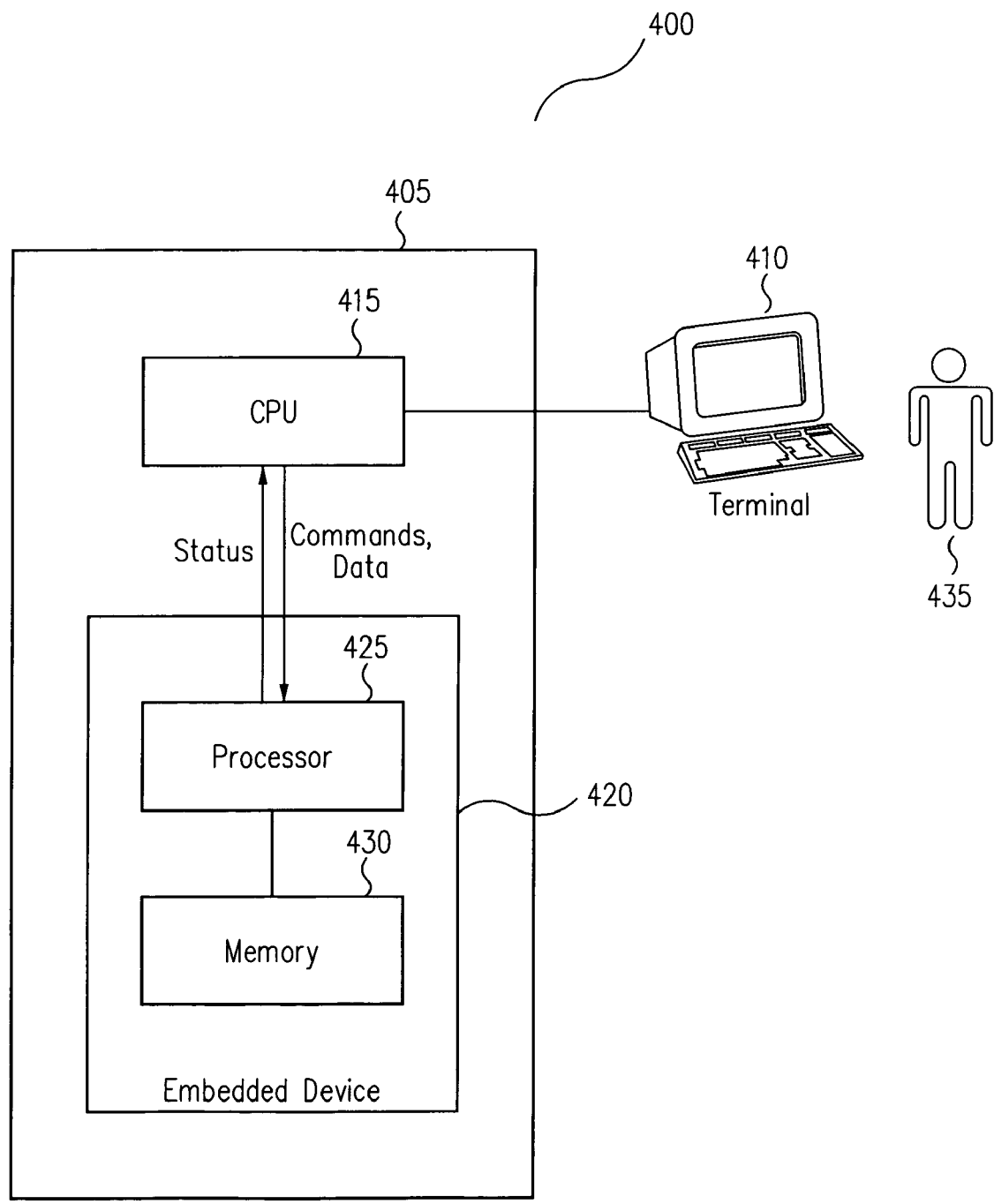
FIG. 4 is a block diagram that illustrates a computer system suitable for implementing aspects of the present invention.

FIG. 4 depicts a block diagram of a computer system 400 suitable for implementing aspects of the present invention. As shown in FIG. 4, computer system 400 includes a central processing unit (CPU) 415 coupled to a workstation 410. The CPU 415 is also coupled to an embedded device 420. The embedded device 420 includes a processor 425 and a memory 430.

According to one embodiment of the present invention, CPU 415 comprises a SPARC IIe CPU, available from Sun Microsystems, Inc., of Palo Alto, Calif.

According to another embodiment of the present invention, processor 425 comprises a DS80CH11 System Energy Manager, available from Dallas Semiconductor Corp. of Dallas, Tex. and memory 430 comprises a Wafer Scale WS 833, available from ST Microlectronics, of San Jose, Calif.

Many other devices or subsystems (not shown) may be connected in a similar manner. Also, it is not necessary for all of the devices shown in FIG. 4 to be present to practice the present invention, as discussed below. Furthermore, the devices and subsystems may be interconnected in different ways from that shown in FIG. 4. The operation of a computer system such as that shown in FIG. 4 is readily known in the art and is not discussed in detail in this application, so as not to overcomplicate the present discussion. Code to implement the present invention may be operably disposed in memory 430 or stored on storage media such as a fixed disk, floppy disk or CD-ROM.

In operation, user 435 enters commands via terminal 410. Upon receiving a code update command, CPU 415 sends a code update command to embedded processor 425. Embedded processor 425 receives the code update command, transfers program control to boot code segment 0, selects a code segment to update, remaps that code segment to data space, erases the segment in data space and then writes the segment. This process continues for all code segments. Once the required number of code segments have been updated, program control is transferred to boot flash memory segment 0, the embedded device is reset and execution begins from boot code segment 0. A code integrity check is performed and if all segments are satisfactory, program control is transferred to main flash memory segment 0 and normal operation resumes. If at least one segment is unsatisfactory, program control is transferred to boot code, and the user is given the opportunity to retry the operation.

According to one embodiment of the present invention, the code integrity check compares bytes in predetermined locations and compares each byte to a corresponding expected value. This is described in more detail below with reference to FIGS. 18-23.

Figure 5:
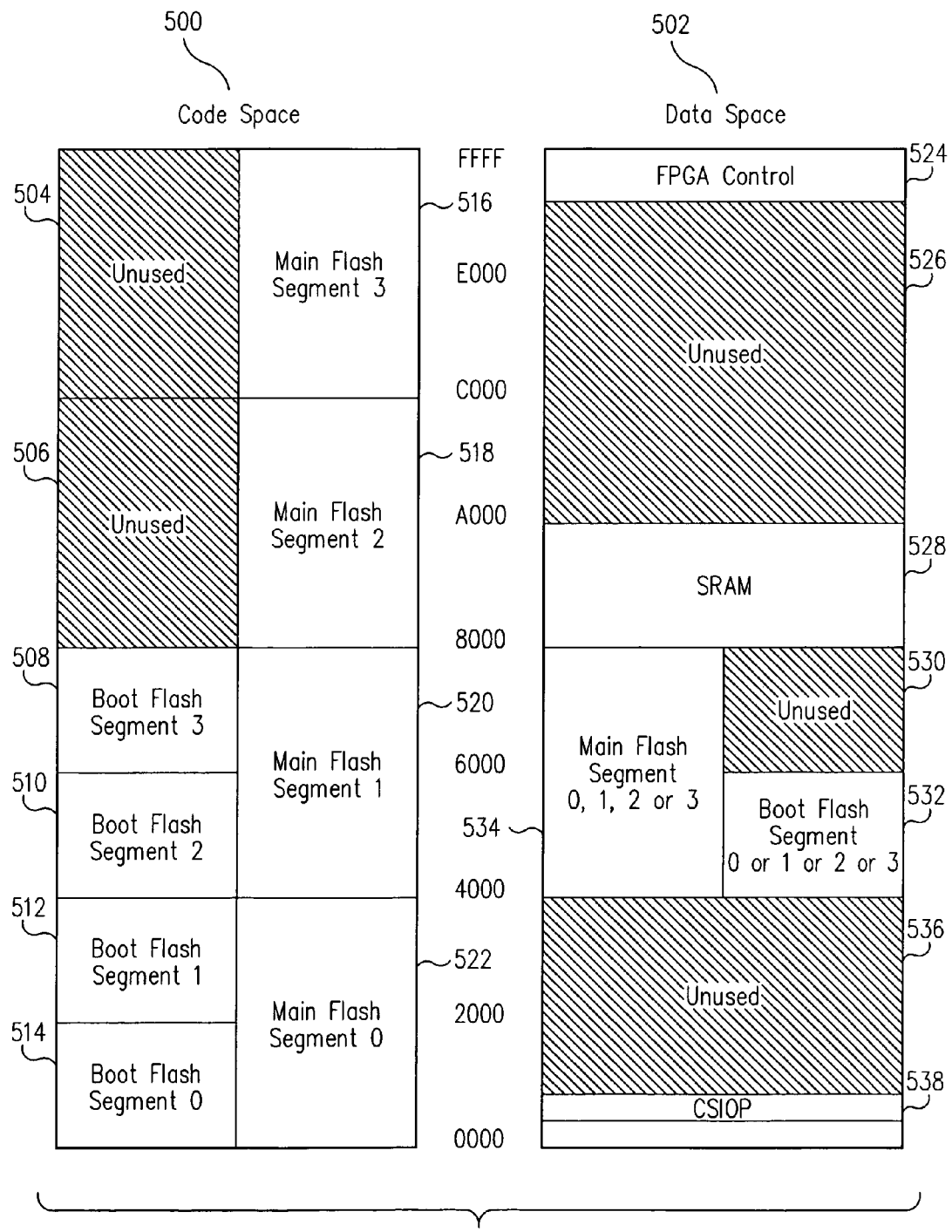
FIG. 5 is a block diagram that illustrates a method for segmenting memory in accordance with one embodiment of the present invention.

Turning now to FIG. 5, a block diagram that illustrates segmenting memory in accordance with one embodiment of the present invention is presented. FIG. 5 illustrates segmenting code space 500 and data space 502. The code space is divided into four 16K main flash memory segments and four 8K boot flash memory segments. Main flash code segments 0 (522), 1 (520), 2 (518) and 3 (516) are mapped to address ranges 0000-3FFF, 4000-7FFF, 8000-BFFF and C000-FFFF, respectively. Boot flash code segments 0 (514), 1 (512), 2 (510) and 3 (508) are mapped to address ranges 0000-1F 2000-3FFF, 4000-5FFF and 6000-7FFF, respectively, in the code space.

The data space is also divided into four 16K main flash memory segments and four 8K boot flash memory segments. However, all four main flash memory segments 534 are mapped to the same address range (4000-7FFF), and all four boot flash memory segments 532 are mapped to the same address range (4000-5FFF).

The memory mapping architecture presented in FIG. 5 is for illustrative purposes only. Those of ordinary skill in the art will recognize that the invention may apply to a different number of segments as well as to segments having various names, sizes and address ranges.

According to one embodiment of the present invention, boot segment 0 is configured with code that allows other segments to be updated and application-specific code is placed in one or more other segments. Configuring boot segment 0 this way decreases the probability that boot segment 0 will require an update, thus increasing reliability.

FIGS. 6A-6B are block diagrams that illustrate methods for segmenting memory in accordance with embodiments of the present invention. FIGS. 6A and 6B represent registers available for configuring address mapping in a WS 833, available from ST Microlectronics of San Jose, Calif. FIG. 6A illustrates configuring a page register. FIG. 6B illustrates configuring a virtual memory register. FIGS. 6A-6B are for illustrative purposes only. Those of ordinary skill in the art will recognize that other memory devices with various control registers may be used.

Referring to FIG. 6A, field 605 is used to select a main flash memory segment. Field 610 is used to select a boot flash memory segment. Field 615 is used to select whether main flash or boot flash code is executed.

Referring to FIG. 6B, field 635 indicates whether code is executed out of boot flash memory. Field 640 indicates whether code is executed out of main flash memory. Field 645 indicates whether data is boot flash data. Field 650 indicates whether data is main flash data.

FIGS. 7A-7B are code samples that illustrate mapping memory in accordance with embodiments of the present invention. FIG. 7A illustrates mapping main flash memory. FIG. 7B illustrates mapping boot flash memory.

Referring to FIG. 7A, note that when main flash is code, the segment number is determined by the address range, and when the device space is data, the address range is the same for all segments.

Referring to FIG. 7B, note that when boot flash is code, the segment number is determined by the address range, and when the device space is data, the address range is the same for all segments.

Figure 8:
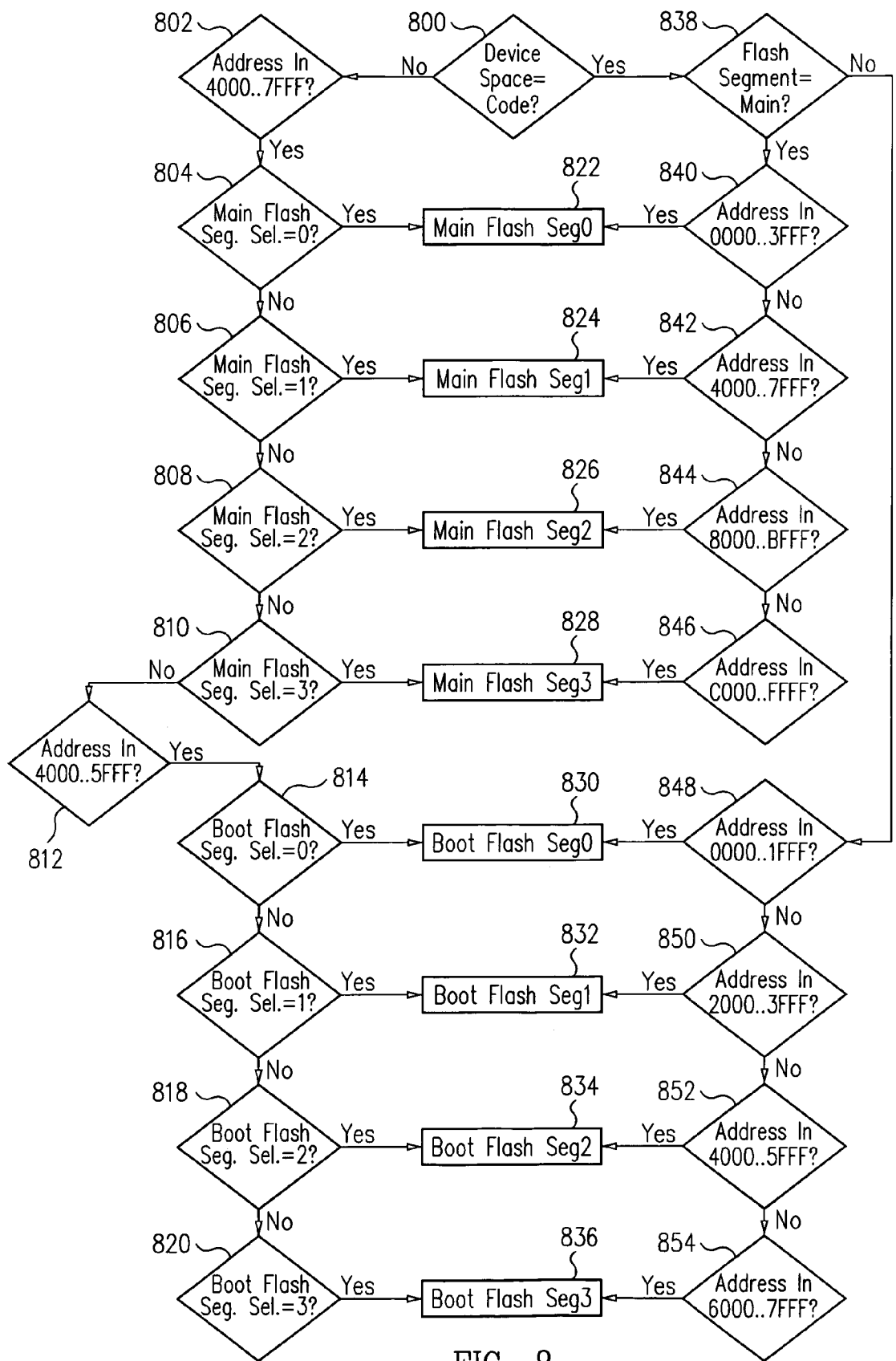
FIG. 8 is a flow diagram that illustrates mapping flash memory in accordance with embodiments of the present invention.

Turning now to FIG. 8, a flow diagram that illustrates mapping memory in accordance with embodiments of the present invention. FIG. 8 uses a flow chart to illustrate the memory mapping shown in FIGS. 7A and 7B. At 800, a determination is made regarding whether the current device space is code or data. If the current device space is code, at 802 a determination is made regarding whether the current address is in the range defined for main flash memory. If the current address is in the range defined for main flash memory, determinations are made at 804, 806, 808 and 810 regarding whether the currently selected main flash memory segment is main flash segment 0, 1, 2 or 3, respectively. A positive determination results in a corresponding main flash segment indication at reference numerals 822, 824, 826 and 828. If the results of determinations 804, 806, 808 and 810 are negative, a determination is made at 812 regarding whether the current address is in the range defined for boot flash memory. If the current address is in the range defined for boot flash memory, determinations are made at 814, 866, 818 and 820 regarding whether the currently selected boot flash memory segment is 0, 1, 2 or 3, respectively. A positive determination results in a corresponding boot flash segment indication at reference numerals 830, 832, 834 and 836.

Still referring to FIG. 8, if at 800 it is determined that the current device space is data, a determinations is made regarding whether the current flash memory segment is a main flash memory segment. If the current flash memory segment is a main flash memory segment determinations are made at 840, 842, 844 and 846 regarding whether the current address is in the range defined for main flash segment 0, 1, 2 or 3, respectively. A positive determination results in a corresponding main flash segment indication at reference numerals 822, 824, 826 and 828. If at 838 the current flash memory segment is a boot flash memory segment, determinations are made at 848, 850, 852 and 854 regarding whether the current address is in the range defined for boot flash memory segments 0, 1, 2 and 3, respectively. A positive determination results in a corresponding boot flash segment indication at reference numerals 830, 832, 834 and 836.

Figure 9:
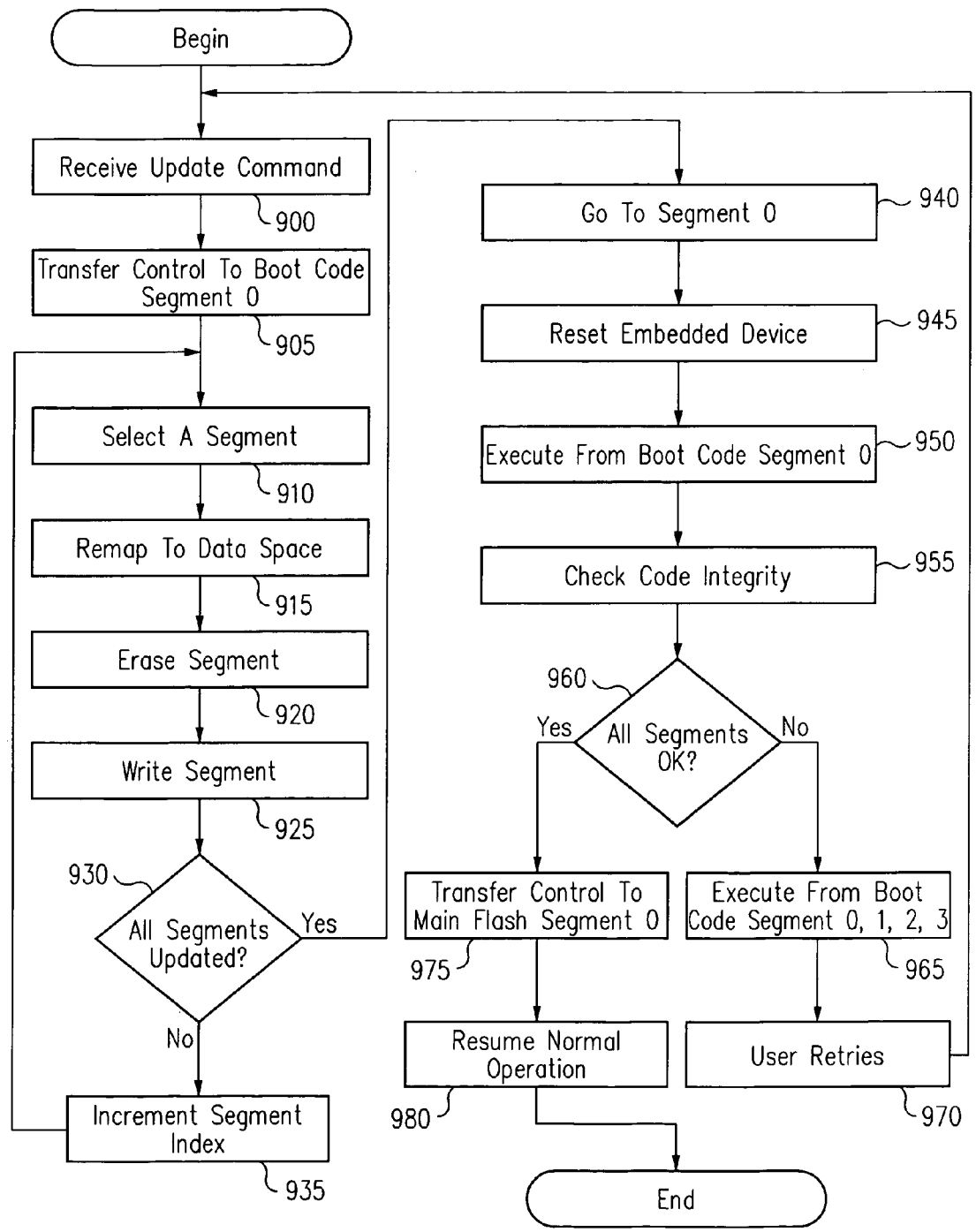
FIG. 9 is a flow diagram that illustrates a method for updating code in accordance with one embodiment of the present invention.
Figure 10:
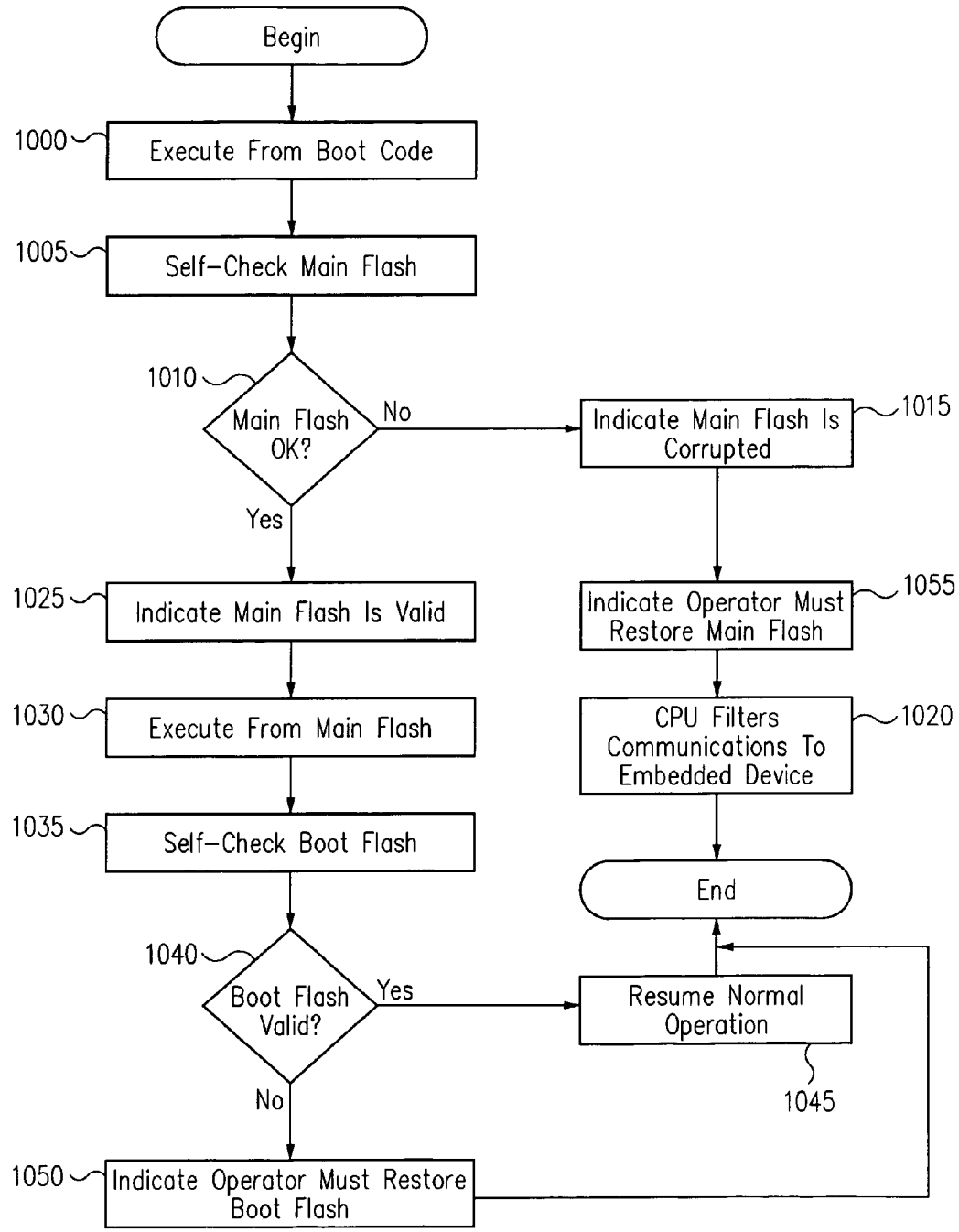
FIG. 10 is a flow diagram that illustrates a method for detecting corrupted code in accordance with one embodiment of the present invention.

FIGS. 9 and 10 are flow diagrams that illustrate methods for updating code and detecting corrupt code in accordance with embodiments of the present invention. FIG. 9 illustrates updating code from the perspective the CPU (reference numeral 415 of FIG. 4). FIG. 10 illustrates detecting corrupted code from the perspective of the embedded device (reference numeral 420 of FIG. 4).

Turning now to FIG. 9, a flow diagram that illustrates a method for updating code in accordance with one embodiment of the present invention is presented. FIG. 9 is shown from the perspective of the CPU (reference numeral 415 of FIG. 4). At 900, an update command is received. At 905, program control is transferred to boot code segment 0. At 910, a segment to write is selected. At 915, the selected segment is remapped to data space. At 920, the segment is erased. At 925, the segment is written. At 930, a determination is made regarding whether all segments have been updated. If another segment needs to be updated, the segment is updated beginning at reference numeral 910. If all segments have been updated, at 940 program control is transferred to segment 0. At 945 the embedded device is reset. At 950, program execution proceeds from boot code segment 0. At 955, code integrity is checked. At 960, a determination is made regarding whether any segment is corrupt. If at least one segment is corrupt, at 965 execution proceeds from a boot flash memory segment and at 970 the user is given the opportunity to retry the update. The update process begins at 900. If no segments are corrupt, execution proceeds from main flash memory segment 0 and normal operation is resumed at 980.

Turning now to FIG. 10, a flow diagram that illustrates a method for detecting corrupted code in accordance with one embodiment of the present invention is presented. FIG. 10 is shown from the perspective of the embedded device (reference numeral 420 of FIG. 4). At 1000, the embedded device executes from boot code. At 1005, a self-check of main flash is performed. At 1010, the results of the self-check are examined. If the self-check results indicate main flash is invalid, an indication to that effect is made at 1015, an indication that the operator must restore main flash is made at 1055 and the CPU enters a "protected" mode, filtering subsequent communications to the embedded device at 1020. The communications are filtered to prevent normal commands from being sent to the embedded device before main flash memory is successfully updated with valid code. Such command filtering prevents the embedded device from entering an unpredictable state.

According to one embodiment of the present invention, the commands allowed to be sent to the embedded device while in protected mode comprises commands to select boot flash memory or main flash memory, commands to select a flash memory segment, commands to erase flash memory and commands to write flash memory.

Still referring to FIG. 10, if the self-check results indicate main flash is valid, an indication to that effect is made at 1025 and the embedded device executes from main flash at 1030. At 1035, a self-check of boot flash is performed. At 1040, the results of the self-check are examined. If the self-check results indicate boot flash is invalid, an indication that the operator must restore boot flash is made at 1050. If the self-check results indicate boot flash is valid, normal operation of the embedded device is resumed at 1045.

Still referring to FIG. 10, if the embedded device is executing from main flash memory, an indication that main flash memory is valid is made at 1025. At 1030, a self-test result is received from the embedded device. At 1035, a determination is made regarding whether the self-test was successful. If the self-test was successful, normal operation is resumed at 1040. If the self-test was unsuccessful, at 1045 an indication that the operator must restore boot flash memory is made. Execution continues at 1010 if the self-test was unsuccessful.

According to one embodiment of the present invention, the program in main flash memory is a main program and the program in boot flash memory is a boot program. The main program includes full program functionality.

According to another embodiment of the present invention, the code space associated with the main program is larger than the code space associated with the boot program. Here, a main program that is larger than the code space associated with the boot program cannot be duplicated in the boot program code space.

According to another embodiment of the present invention, the main program is larger than the boot program.

Figure 13:
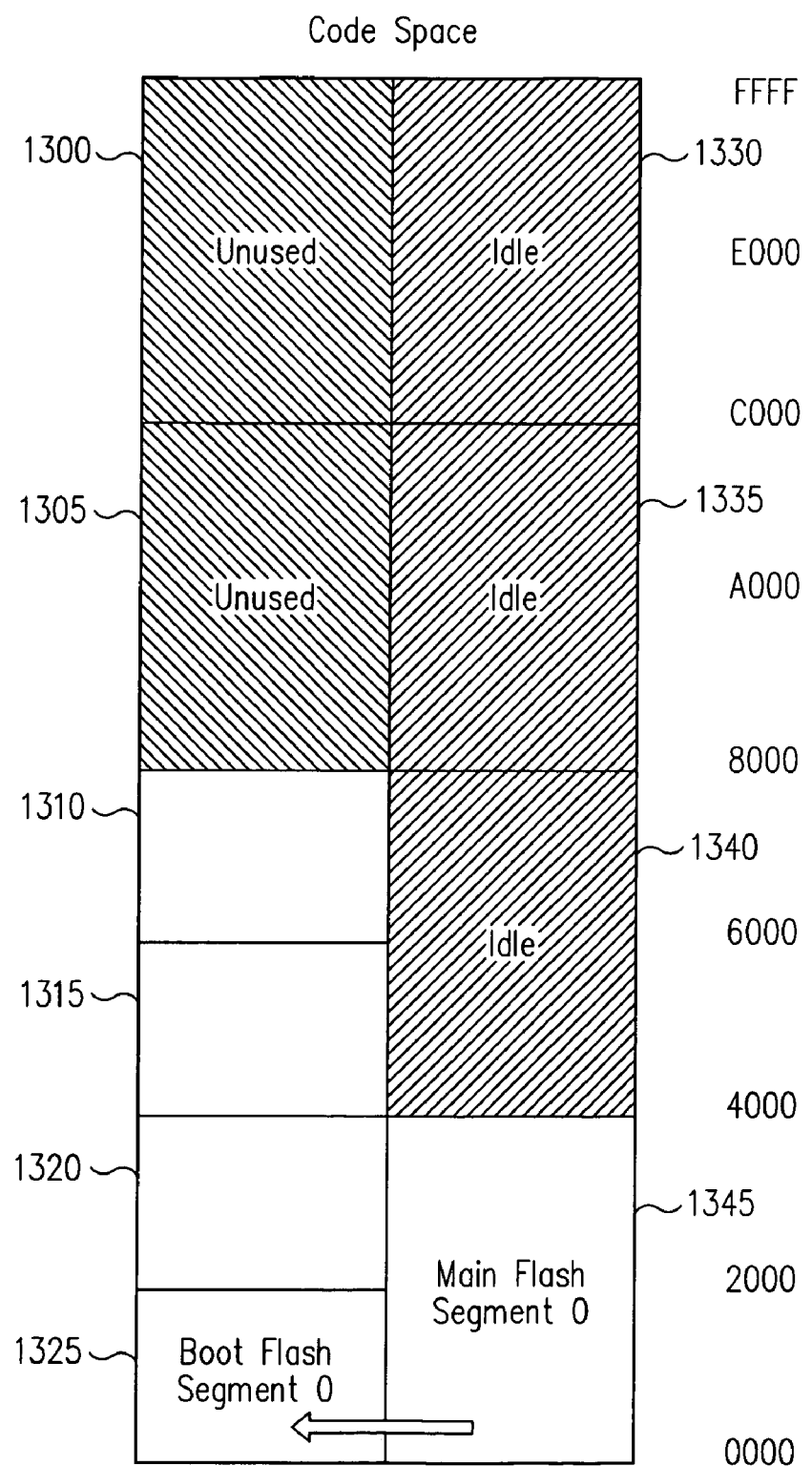
FIG. 13 is a block diagram that illustrates the state of main flash memory and boot flash memory when passing program control to boot flash memory in accordance with one embodiment of the present invention.
Figure 14:
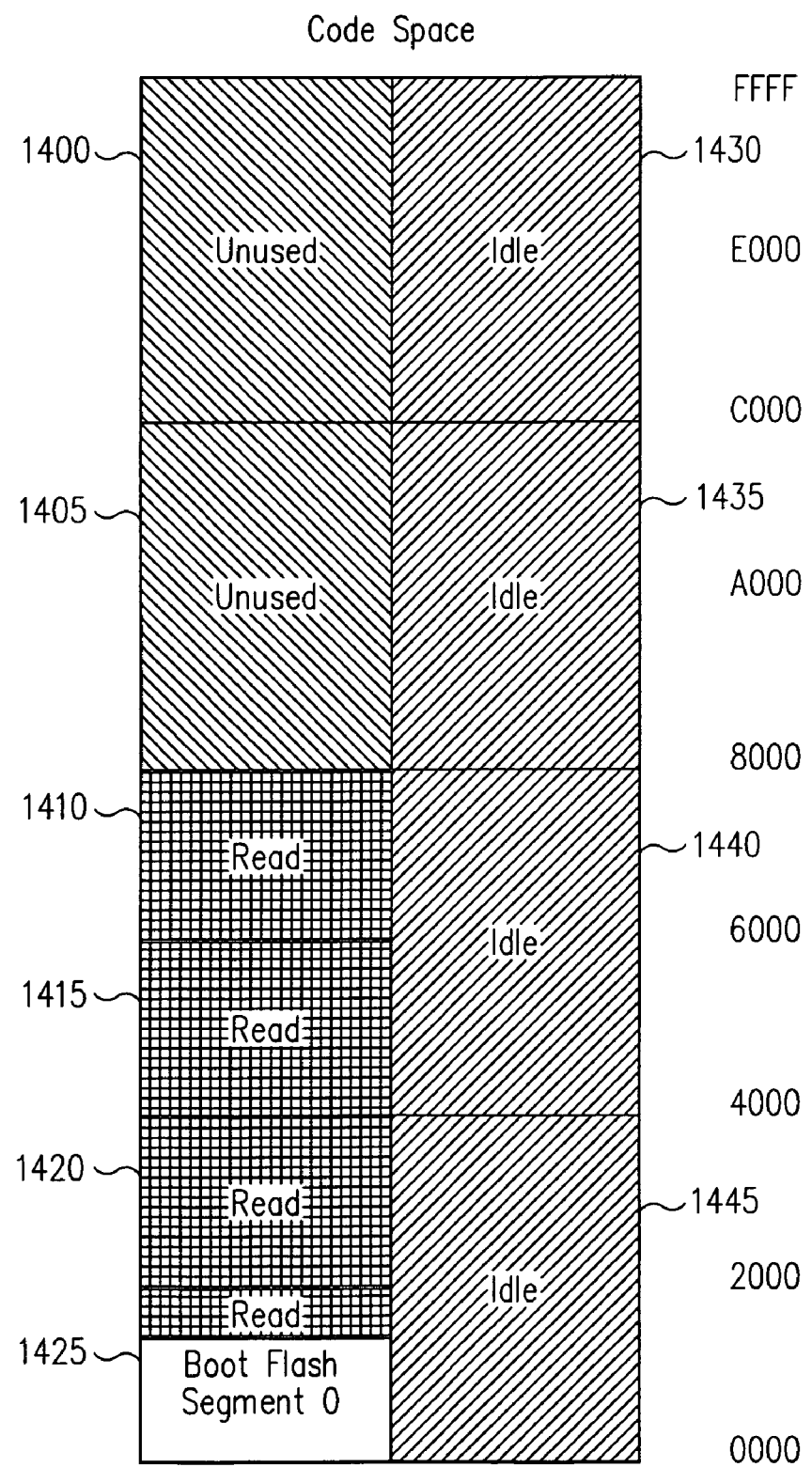
FIG. 14 is a block diagram that illustrates the state of main flash memory and boot flash memory after passing program control to boot flash memory in accordance with one embodiment of the present invention.
Figure 15:
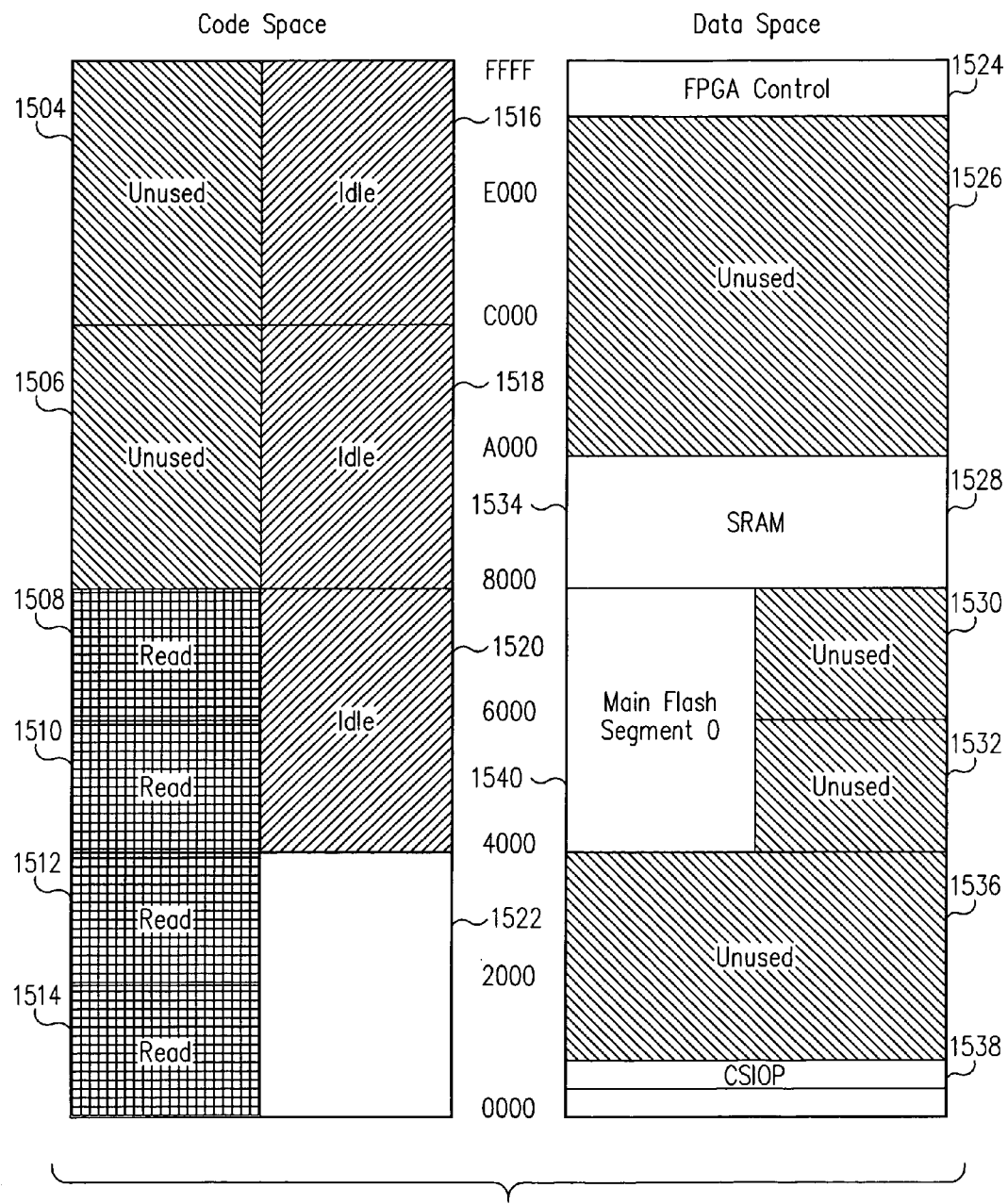
FIG. 15 is a block diagram that illustrates the state of main flash memory and boot flash memory when mapping a main flash code segment to data space in accordance with one embodiment of the present invention.

FIGS. 11-15 the state of code memory for a process that begins with power-up (FIG. 11) and ends with updating main flash code (FIG. 15).

Figure 11:
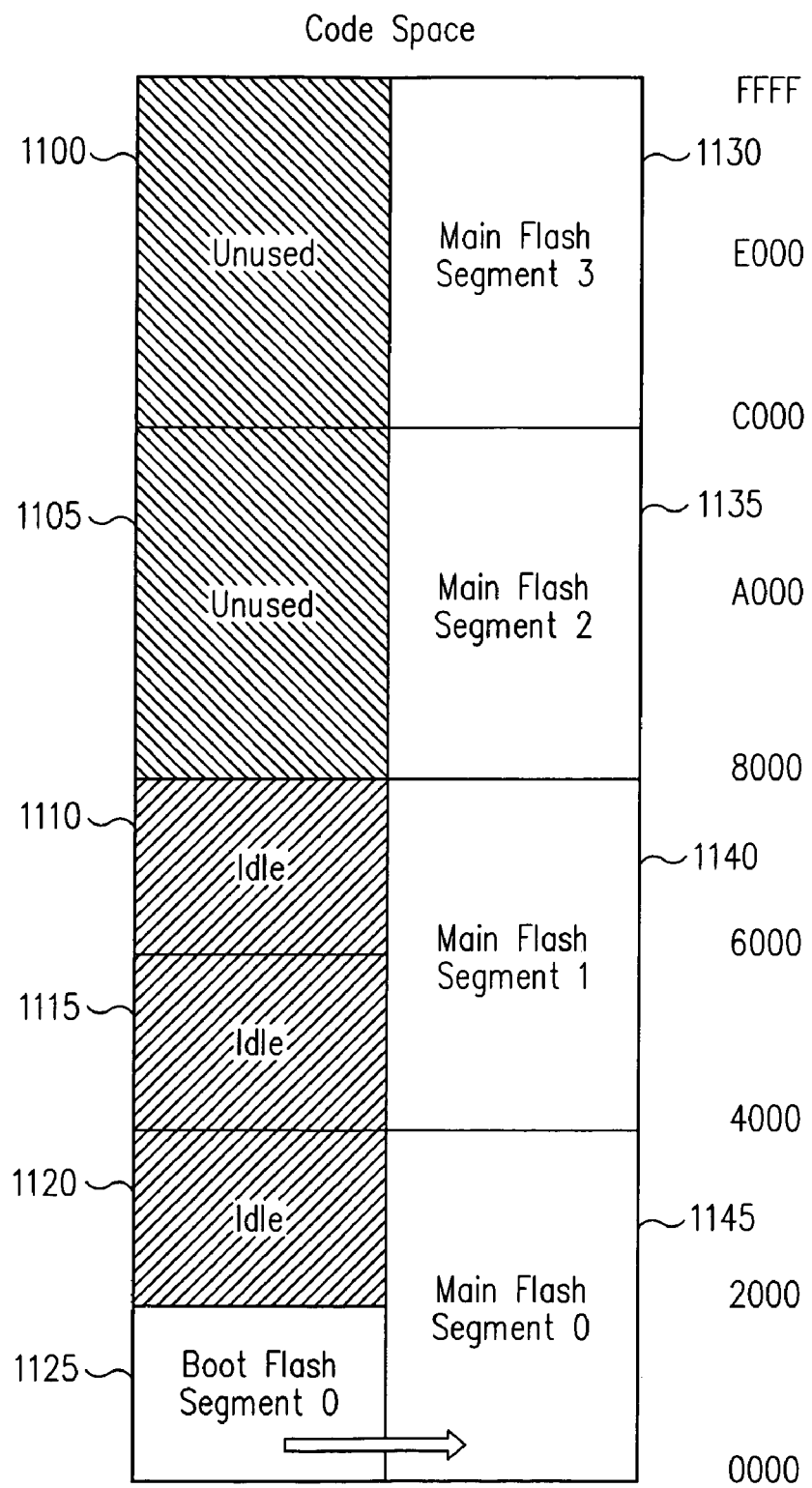
FIG. 11 is a block diagram that illustrates the state of main flash memory and boot flash memory during power-up in accordance with one embodiment of the present invention.

Turning now to FIG. 11, a block diagram that illustrates the state of main flash memory and boot flash memory during power-up in accordance with one embodiment of the present invention is presented. At power-up, execution begins in boot flash memory segment 0 (1125). The integrity of the main flash code space is checked and then control is passed to main flash memory segment 0 (1145). At this point, boot flash memory segments 0 (1125), 1 (1120), 2 (1115) and 3 (1110) are idle and main flash memory segments 0 (1145), 1 (1140), 2 (1135) and 3 (1130) are selected for program execution.

Figure 12:
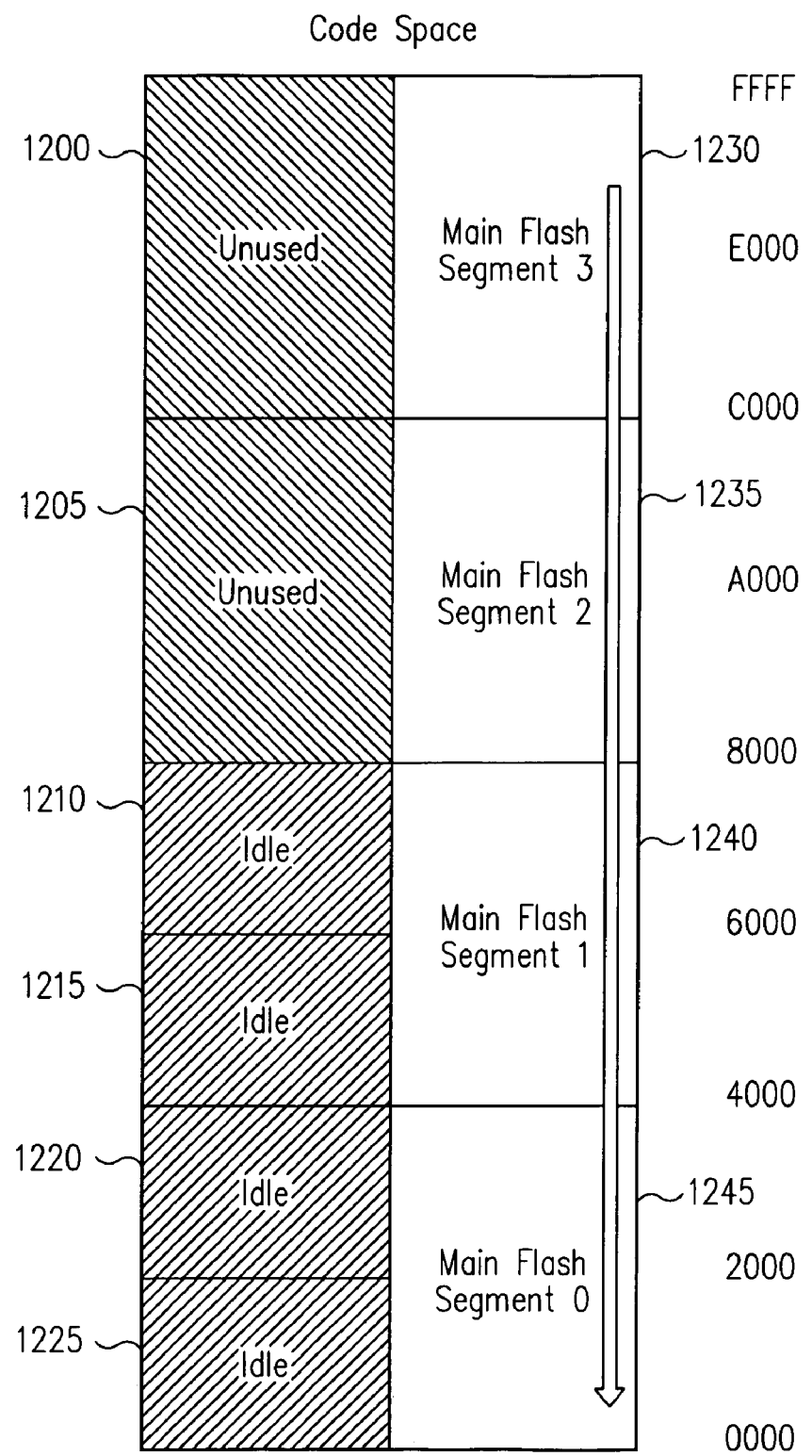
FIG. 12 is a block diagram that illustrates the state of main flash memory and boot flash memory when the code in main flash memory is preparing to transfer program control to boot code in accordance with one embodiment of the present invention.

Turning now to FIG. 12, a block diagram that illustrates the transition that happens when code in main flash memory is preparing to transfer control to code in boot segment 0 in accordance with one embodiment of the present invention is presented. The transfer of program control is initiated when the embedded processor (reference numeral 425 of FIG. 4) receives a code update command.

Turning now to FIG. 13, a block diagram that illustrates the state of main flash memory and boot flash memory when passing program control to boot flash memory in accordance with one embodiment of the present invention is presented. After program control is passed to main flash memory segment 0 (1345), control is passed to boot flash memory segment 0 (1325).

Turning now to FIG. 14, a block diagram that illustrates the state of main flash memory and boot flash memory after passing program control to boot flash memory in accordance with one embodiment of the present invention is presented. After program control is passed to boot flash memory segment 0 (1425), main flash memory segments 0 (1445), 1 (1440), 2 (1435) and 3 (1430) are idle and code is run from boot flash memory segments 0 (1425), 1 (1420), 2 (1415) and 3 (1410).

Once a corrupt main flash memory segment has been detected and program control has been passed to boot flash memory, main flash code must be updated. Since code space is read-only, the main flash memory segments are mapped one at a time to data space and then new code is written. This is illustrated with reference to FIG. 15, below.

Turning now to FIG. 15, a block diagram that illustrates the state of main flash memory and boot flash memory when mapping a main flash code segment to data space in accordance with one embodiment of the present invention is presented. While code is being executed in boot flash memory segments 0 (1514), 1 (1512), 2 (1510) and 3 (1508), the main flash memory segments are mapped one at a time to data space. Segment 1540 shows mapping main flash code segment 0 to data space. The same segment (1540) is also used for mapping other main flash code segments.

Figure 16:
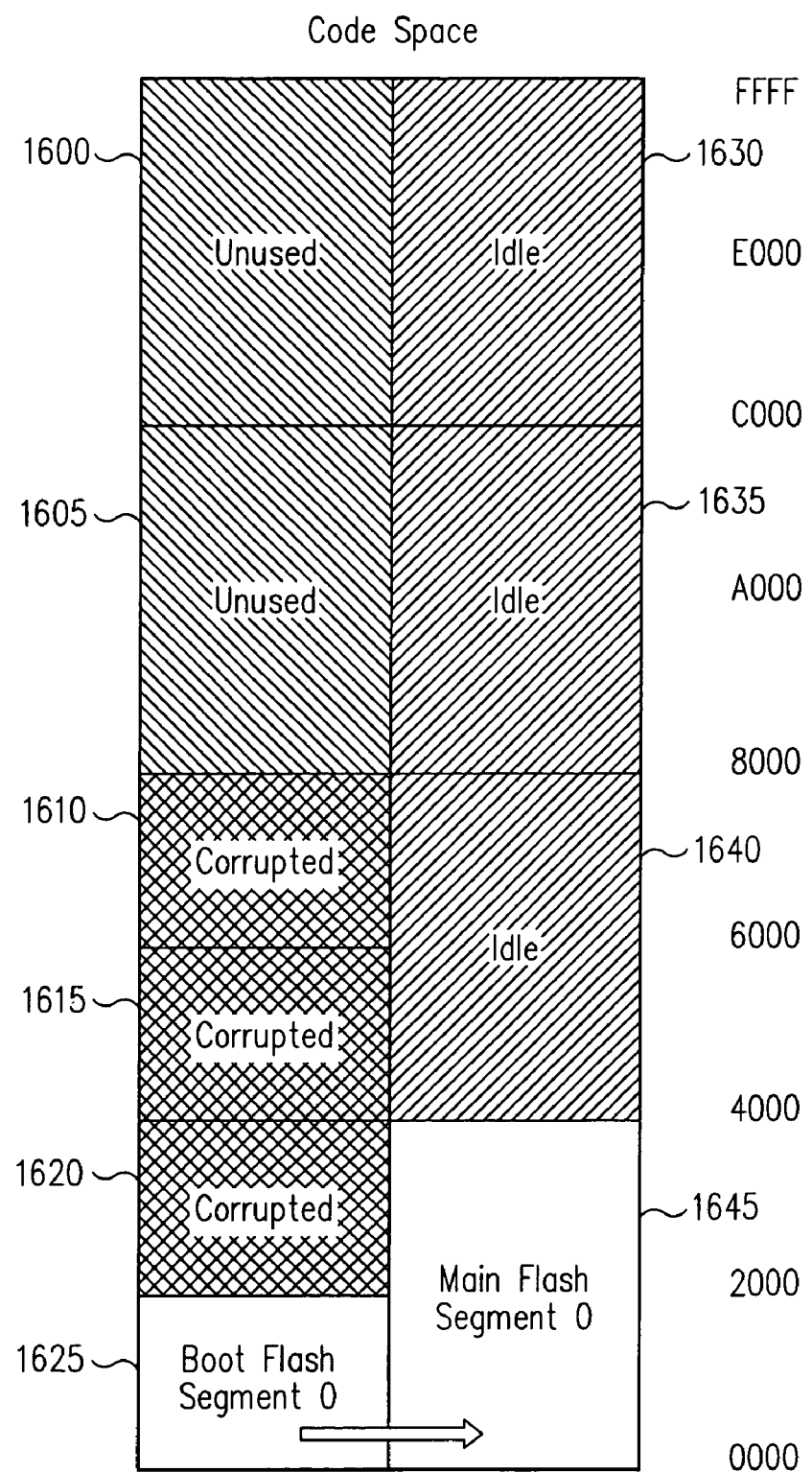
FIG. 16 is a block diagram that illustrates the state of main flash memory and boot flash memory when a corrupt boot flash memory segment is detected in accordance with one embodiment of the present invention.
Figure 17:
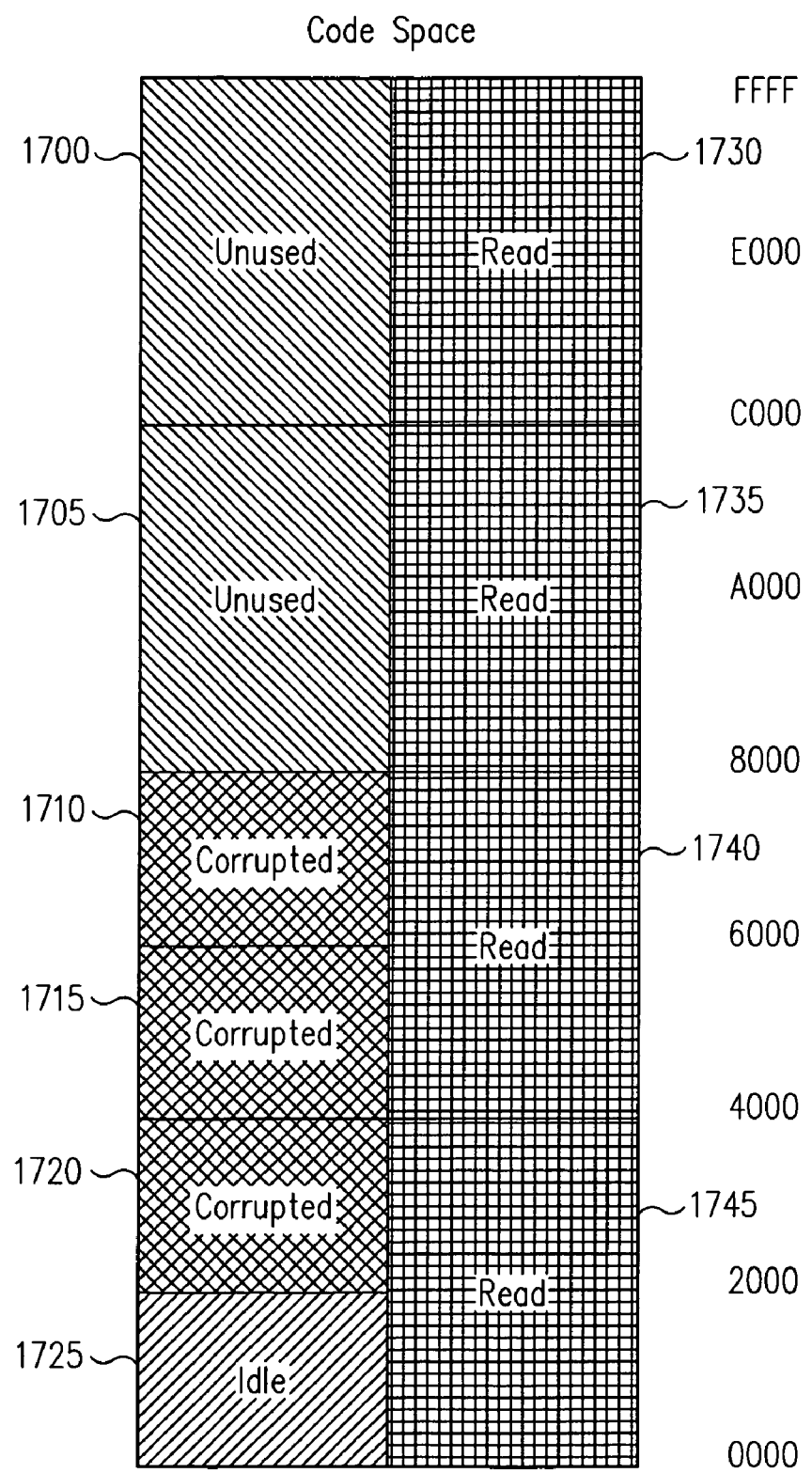
FIG. 17 is a block diagram that illustrates the state of main flash memory and boot flash memory after program control is transferred to main flash memory upon detecting a corrupt boot flash memory segment in accordance with one embodiment of the present invention.
Figure 18:
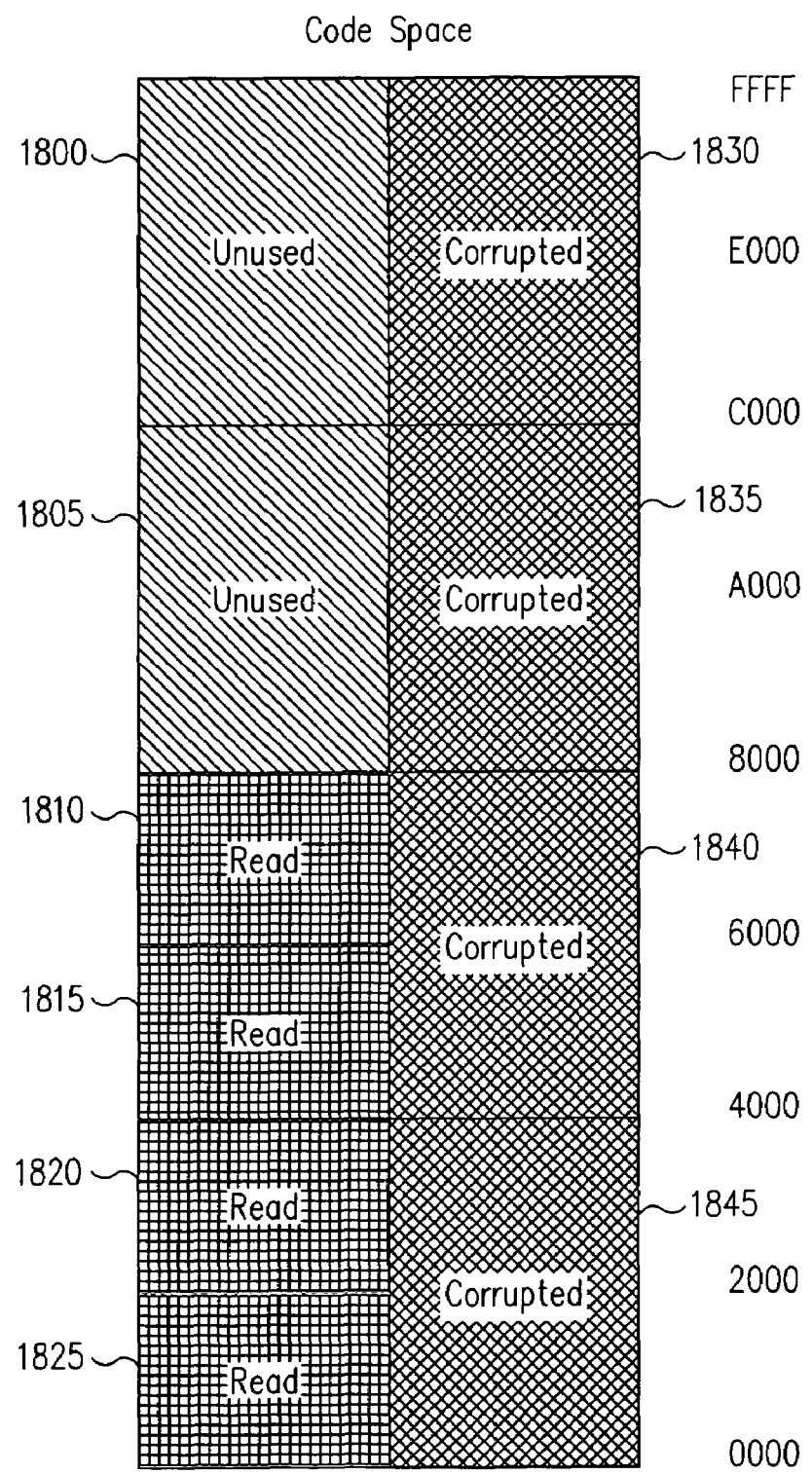
FIG. 18 is a block diagram that illustrates the state of main flash memory and boot flash memory when a corrupt main flash memory segment is detected in accordance with one embodiment of the present invention.

FIGS. 16-17 illustrate the state of code memory for a process that begins with detecting a corrupt boot flash memory segment (FIG. 16) and ends with transferring program control to main flash memory (FIG. 17).

Turning now to FIG. 16, a block diagram that illustrates the state of main flash memory and boot flash memory when a corrupt boot flash memory segment is detected in accordance with one embodiment of the present invention is presented. Upon power-up, boot flash memory segment 0 (1625) executes. Corrupt boot segments 1 (1620), 2 (1615) and 3 (1610) are detected, at which point program control is passed to main flash memory segment 0 (1645).

Turning now to FIG. 17, a block diagram that illustrates the state of main flash memory and boot flash memory after program control is transferred to main flash memory upon detecting a corrupt boot flash memory segment in accordance with one embodiment of the present invention is presented. After program control is passed to main flash memory segment 0 (1745), program execution proceeds from main flash memory segments 0 (1745), 1 (1740), 2 (1735) and 3 (1730).

Detecting Software Corrupt Code

According to embodiments of the present invention, predetermined values ("marker values") are written to predetermined memory locations (marker locations) in a program that is downloaded to an embedded device. The marker values and marker locations use a correlation rule known to the CPU (reference numeral 415 of FIG. 4) and the embedded device. The correlation rule establishes a relationship between two or more marker values. Once the program is downloaded to the embedded device, the embedded device applies the correlation rule to the marker locations. Corrupted memory (FIG. 18) is indicated when a marker value differs from an expected value.

According to one embodiment of the present invention, marker values are changed for each code version, but the correlation rule used to compare the marker values remains the same.

According to one embodiment of the present invention, the correlation rule comprises comparing the content of the first memory location or memory unit of a segment with the last memory location of the segment.

According to one embodiment of the present invention, the correlation rule comprises comparing the content of the first memory location of a segment with the last memory location of the segment and indicating the segment is corrupt if the content of the first memory location does not equal the complement of the second memory location. Those of ordinary skill in the art will recognize that other comparisons may be made.

According to another embodiment of the present invention, the correlation rule comprises comparing the content of a memory location in a first memory segment with the content of a memory location in a second memory segment and indicating a corrupt segment if the content of the first memory location does not equal the complement of the second memory location.

Figure 19:
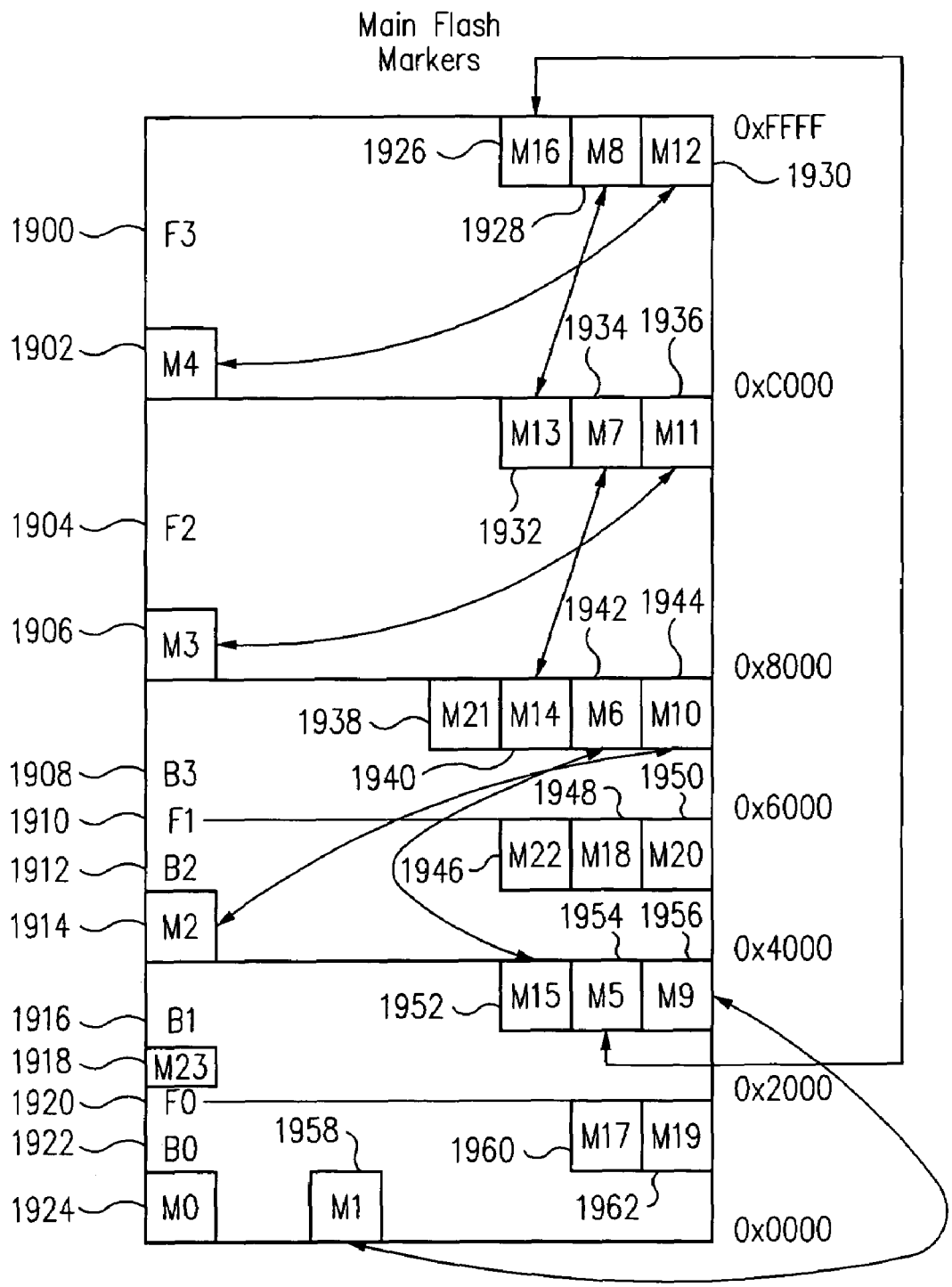
FIG. 19 is a block diagram that illustrates the placement of markers in main flash memory in accordance with one embodiment of the present invention.
Figure 20:
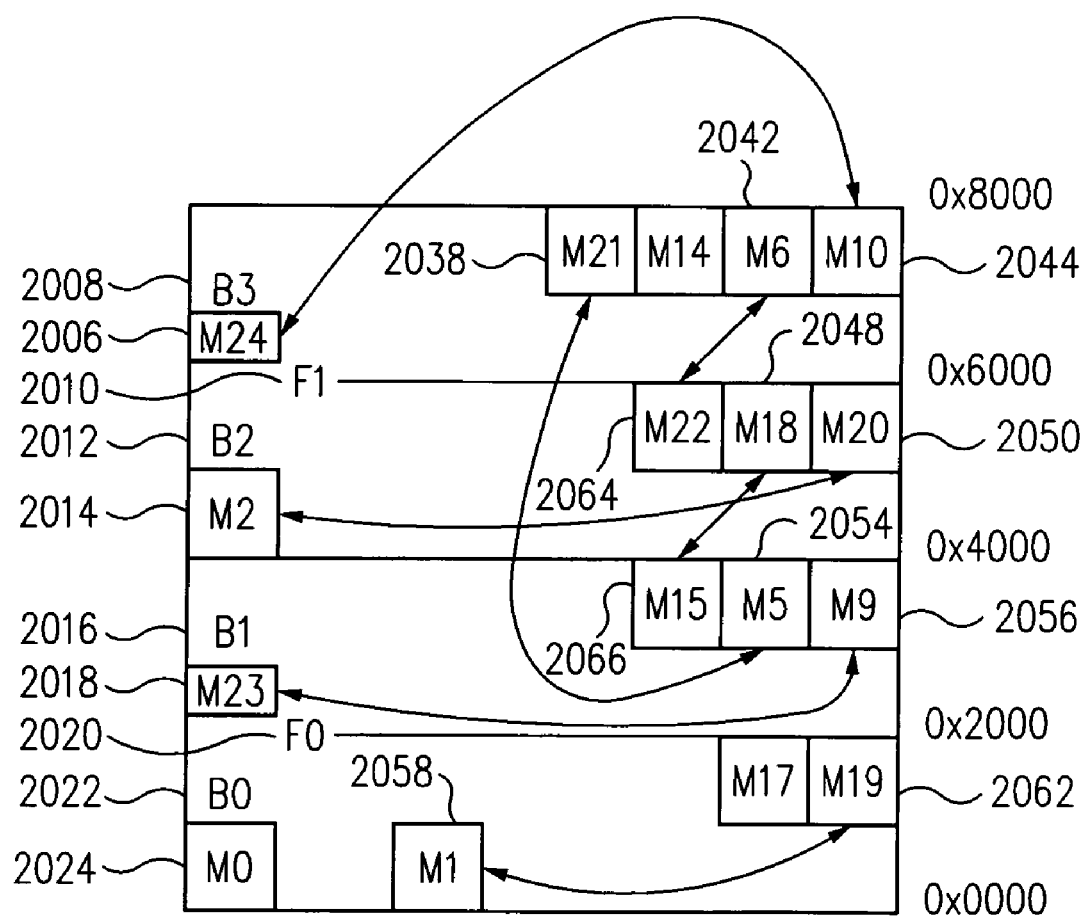
FIG. 20 a block diagram that illustrates the placement of markers in boot flash memory in accordance with one embodiment of the present invention.

FIGS. 19-21B illustrate exemplary correlation rules in accordance with embodiments of the present invention. FIG. 19 illustrates main flash memory markers. FIG. 20 illustrates boot flash memory markers. FIG. 21A illustrates marker correlation corresponding to FIG. 19. FIG. 21B illustrates marker correlation corresponding to FIG. 20.

Turning now to FIG. 19, a block diagram that illustrates the placement of markers in main flash memory in accordance with one embodiment of the present invention is presented. FIG. 19 includes main flash memory segments F0 (1920), F1 (1910), F2 (1904) and F3 (1900). Each main flash memory segment (1920, 1910, 1904, 1900) includes markers that check the internal consistency of the segment. The markers occupy the first and last memory location of each segment. The markers may occupy other locations in a segment as well. Thus, M4 (1902) is compared with M12 (1930), M3 (1906) is compared with M11 (1936), M2 (1914) is compared with M10 (1944) and M1 (1958) is compared with M9 (1956). Marker M1 (1958) is used instead M0 (1924) to compare against M9 (1956), illustrating a case where a memory location is not available for use as a marker, such as, by way of example, when the location forms part of a power-up vector. These parings are listed at reference numeral 2100 of FIG. 21A.

Still referring to FIG. 19, each main flash memory segment (1920, 1910, 1904, 1900) also includes markers used to detect when a flash memory update fails at a segment boundary. Each marker pair includes markers from adjacent segments. A marker in the first segment is compared with a marker in the last segment. Thus, M8 (1928) is compared with M13 (1932), M7 (1934) is compared with M14 (1940), M6 (1942) is compared with M15 (1952) and M5 (1954) is compared with M16 (1926). These parings are listed at reference numeral 2105 of FIG. 21A.

Turning now to FIG. 20, a block diagram that illustrates the placement of markers in boot flash memory in accordance with one embodiment of the present invention is presented. FIG. 20 includes boot flash memory segments B0 (2022), B1 (2016), B2 (2012) and B3 (2008). To check the internal consistency of each segment, M10 (2044) is compared with M24 (2006), M20 (2050) is compared with M2 (2014), M9 (2056) is compared with M23 (2018) and M19 (2062) is compared with M1 (2058). As illustrated in FIG. 20, marker M1 (2058) is not the first location in boot segment B0 (2022) because TBD. These parings are listed at reference numeral 2110 of FIG. 21B.

Still referring to FIG. 20, each boot flash memory segment (2022, 2016, 2012, 2008) also includes markers used to detect when a flash memory update fails at a segment boundary. M21 (2038) is compared with M5 (2054), M15 (2066) is compared with M18 (2048) and M22 (2064) is compared with M6 (2042). These parings are listed at reference numeral 2115 of FIG. 21B.

FIGS. 21A-21B are tables that illustrate correlation between markers in accordance with embodiments of the present invention. FIG. 21A illustrates correlation between markers in a main flash memory as shown in FIG. 19. FIG. 21B illustrates correlation between markers in a boot flash memory as shown in FIG. 20.

Figure 22:
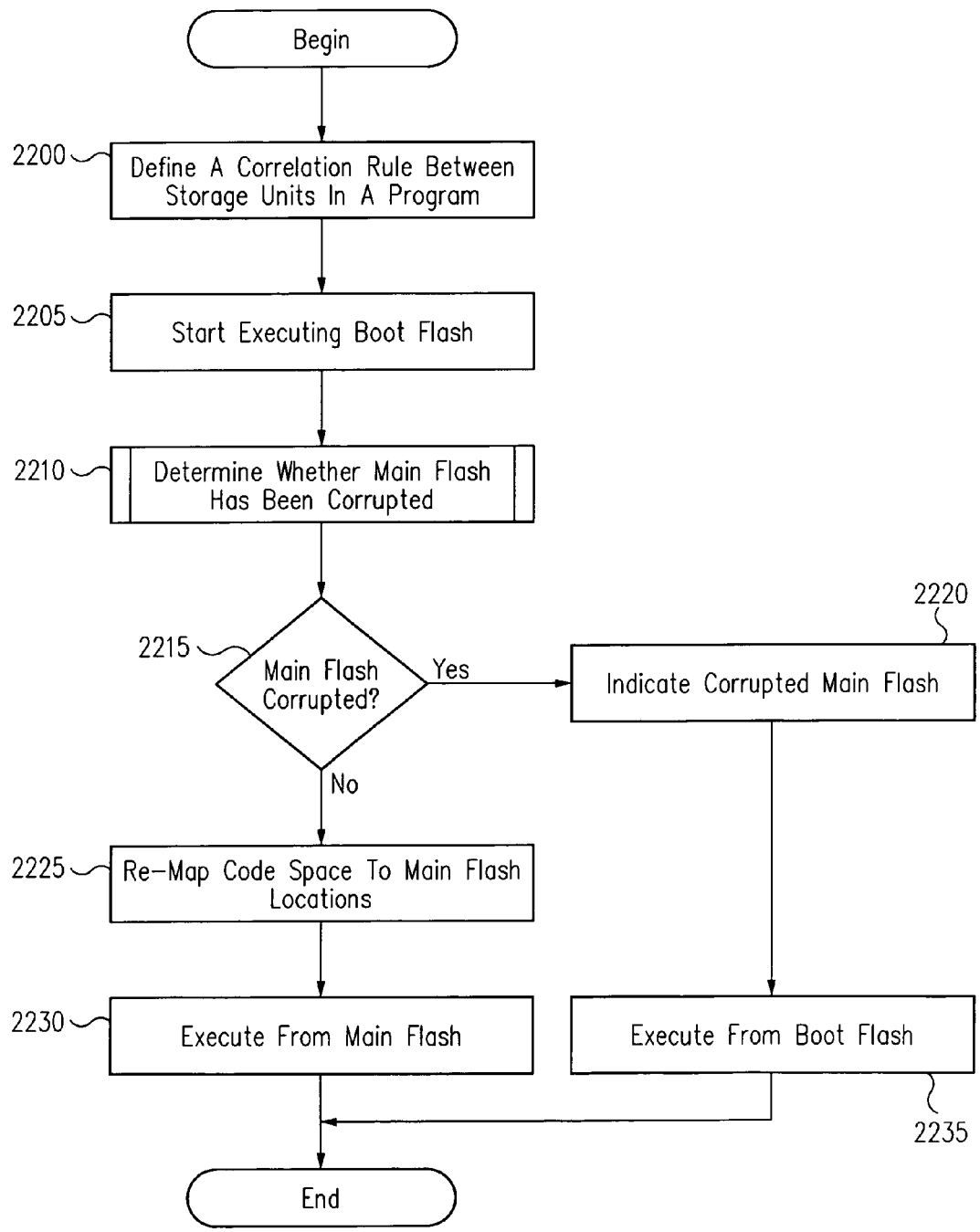
FIG. 22 is a flow diagram that illustrates a method for detecting corrupted code in accordance with one embodiment of the present invention.

Turning now to FIG. 22, a flow diagram that illustrates a method for detecting corrupted code in accordance with one embodiment of the present invention is presented. At 2200, a correlation rule between storage units in a program is defined. The correlation rule defines which storage units are to be compared and what relationship each storage unit should have to the storage unit with which it is compared. An exemplary correlation rule may specify that the first and last storage units of each memory segment are to be compared and that the value of each storage unit should be the complement of the storage unit with which it is compared. Those of ordinary skill in the art will recognize that other storage units and other relationships between storage units may be used.

Still referring to FIG. 22, at 2205 execution begins in boot flash memory. At 2210, a determination is made regarding whether main flash memory has been corrupted. If main flash memory has been corrupted, an indication is made at 2220 and execution proceeds from boot flash memory at 2235. If main flash memory has not been corrupted, the code space is re-mapped to main flash memory locations. At 2230, execution proceeds from main flash memory.

Figure 23:
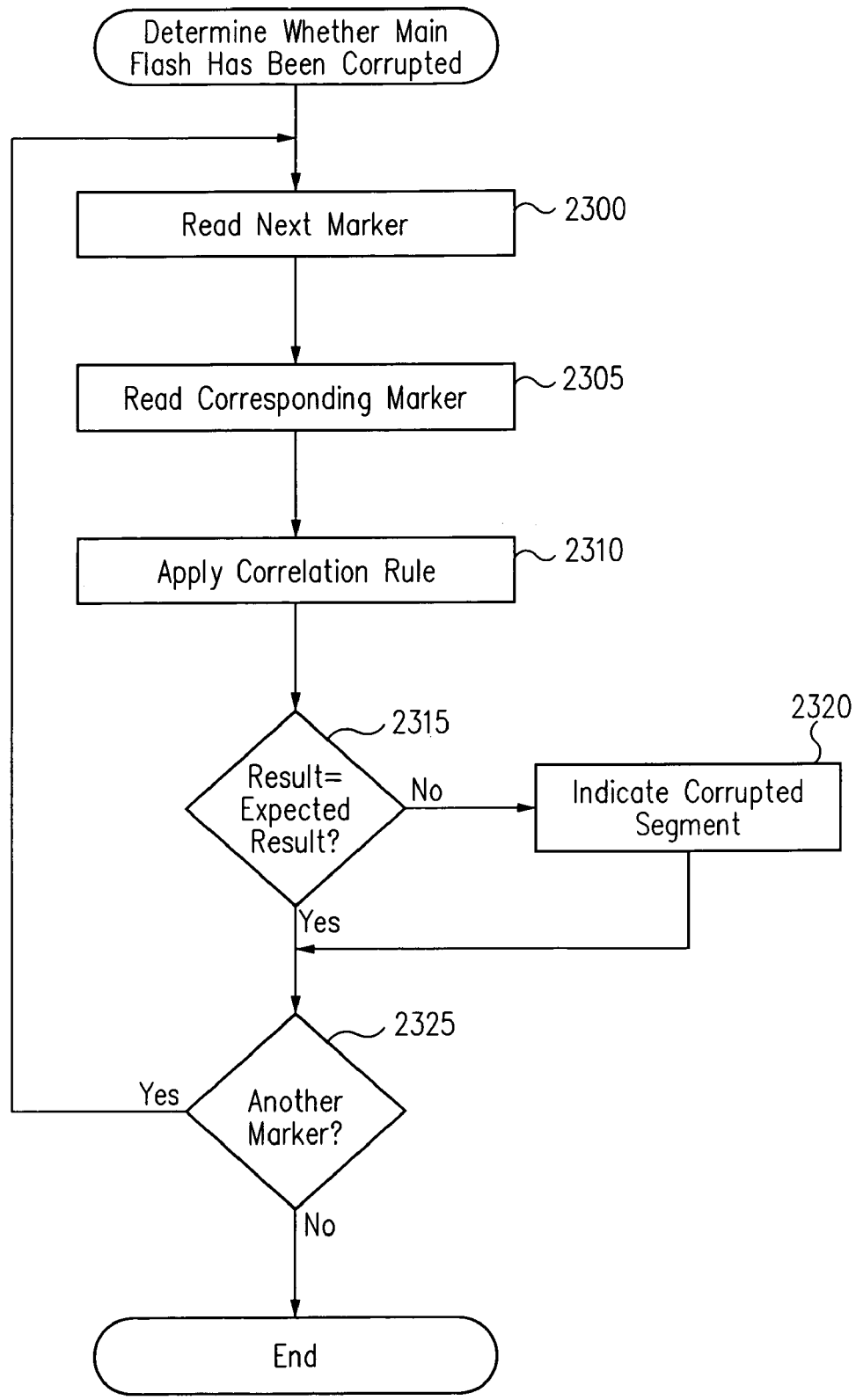
FIG. 23 is a flow diagram that illustrates a method for determining whether main flash memory has been corrupted in accordance with one embodiment of the present invention.

Turning now to FIG. 23, a flow diagram that illustrates a method for determining whether main flash memory has been corrupted in accordance with one embodiment of the present invention is presented. FIG. 23 provides more detail for reference numeral 2210 of FIG. 22. At 2300, a first marker is read. At 2305, a second marker corresponding to the first marker is read. At 2310, the correlation rule is applied. At 2315, a determination is made regarding whether the result of applying the correlation rule matches the expected result. If the two results do not match, a corrupted segment is indicated at 2320. If the two results match, a determination regarding whether more markers remain is made at 2325. This process continues for all markers defined for the program until a corrupted segment is found or until all markers for the program have been examined.

Embodiments of the present invention have a number of advantages. Using a correlation rule to compare particular locations in a program downloaded to an embedded device provides a relatively efficient mechanism for detecting corrupted code. Time-consuming read-and-compare operations are no longer required because the correlation rule is known by and is directly applied by the embedded device itself. The correlation rule also obviates the need for specialized knowledge about particular code versions. Mapping memory as described also enables a relatively reliable and efficient means for updating code.

Embodiments of the present invention have been illustrated using embedded devices that use flash memory. However, those of ordinary skill in the art will appreciate that the invention may be applied to non-embedded devices as well. Additionally, those of ordinary skill in the art will recognize that other types of memory may be used.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for managing remote software code update, comprising:

receiving, by a processor, a message from an embedded device, said embedded device comprising a first code space comprising at least one segment and a second code space comprising one or more segments wherein said processor is included in a device different from said embedded device;

decoding, by said processor, said message to determine an execution mode of said embedded device;

indicating, by said processor, code in said first code space is corrupted if said execution mode indicates said embedded device is executing in said second code space; and indicating, by said processor, said code in said first code space is valid if said execution mode indicates said embedded device is executing in said first code space.

2. The method of claim 1, further comprising:

receiving self-test results from said embedded device if said first code space is valid; and indicating, by said processor, code in said second code space must be restored when said self-test results indicate said code in said second code space is invalid.

3. The method of claim 1, further comprising filtering subsequent communications from said processor to said embedded device if said execution mode indicates said embedded device is executing in said second code space.

4. An apparatus for managing remote software code update, comprising:
   a memory;
   a network interface coupled to said memory and configured to receive a message from an embedded device, said embedded device comprising a first code space comprising at least one segment and a second code space comprising one or more segments; and
   a processor coupled to said network interface and configured to decode said message to determine an execution mode of said embedded device, said processor further configured to indicate acids in said first code space is corrupted if said execution mode indicates said embedded device is executing in said second code space, and said processor further configured to indicate said code in said first code space is valid if said execution mode indicates said embedded device is executing in said first code space wherein said processor is included in a device different from said embedded device.

5. The apparatus of claim 4 wherein said network interface is further configured to receive self-test results from said embedded device if said first code space is valid; and said processor is further configured to indicate code in said second code space must be restored when said self-test results indicate said code in said second code space is invalid.

6. The apparatus of claim 4 wherein said processor is further configured to filter subsequent communications to said embedded device if said execution mode indicates said embedded device is executing in said second code space.

7. A method for managing remote software code update, comprising:
   examining, by a processor, a message received from a remote device to determine an execution mode of said remote device, said remote device comprising a first code space comprising at least one segment and a second code space comprising one or more segments wherein said processor is included in a device different from said remote device; and
   indicating validity of code in said first code space based on whether said execution mode indicates said remote device is executing in said second code space.

\* \* \* \* \*

UNITED STATES PATENT AND TRADEMARK OFFICE
CERTIFICATE OF CORRECTION

PATENT NO. : 7,266,731 B2 Page 1 of 1
APPLICATION NO. : 09/991338
DATED : September 4, 2007
INVENTOR(S) : Gunawan Ali-Santosa and Mehrdad Mojgani It is certified that error appears in the above-identified patent and that said Letters Patent is hereby corrected as shown below:

Column 13, Claim 4, Line 16, replace "acids" with --code--.

Signed and Sealed this

Fourth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,266,731 B2 Page 1 of 1
APPLICATION NO. : 09/991338
DATED : September 4, 2007
INVENTOR(S) : Gunawan Ali-Santosa and Mehrdad Mojgani It is certified that error appears in the above-identified patent and that said Letters Patent is hereby corrected as shown below:

Column 13, Claim 4, Line 16, replace "acids" with --code--.

Signed and Sealed this

Twenty-fifth Day of March, 2008

JON W. DUDAS
*Director of the United States Patent and Trademark Office*